(12) United States Patent
Kwon et al.

(10) Patent No.: US 9,825,738 B2
(45) Date of Patent: Nov. 21, 2017

(54) ACKNOWLEDGEMENT METHOD AND MULTI USER TRANSMISSION METHOD

(71) Applicant: NEWRACOM, INC., Irvine, CA (US)

(72) Inventors: Yongjin Kwon, Daejeon (KR); Jong-Ee Oh, Irvine, CA (US); Hyungu Park, Daejeon (KR); Je-Hun Lee, Irvine, CA (US); Hong Soog Kim, Daejeon (KR); Heejung Yu, Daegu (KR); Minho Cheong, Irvine, CA (US); Hyoung Jin Kwon, Daejeon (KR)

(73) Assignee: NEWRACOM, INC., Irvine, CA (US)

( * ) Notice: Subject to any disclaimer, the term of this patent is extended or adjusted under 35 U.S.C. 154(b) by 112 days.

(21) Appl. No.: 14/678,724

(22) Filed: Apr. 3, 2015

(65) Prior Publication Data

US 2015/0288501 A1 Oct. 8, 2015

Related U.S. Application Data

(60) Provisional application No. 61/981,427, filed on Apr. 18, 2014, provisional application No. 61/975,622, filed on Apr. 4, 2014.

(51) Int. Cl.
*H04L 1/00* (2006.01)
*H04L 1/06* (2006.01)
(Continued)

(52) U.S. Cl.
CPC .......... *H04L 5/0007* (2013.01); *H04L 1/1614* (2013.01); *H04L 1/0057* (2013.01);
(Continued)

(58) Field of Classification Search
CPC .... H04B 7/024; H04B 7/0404; H04B 7/0413; H04B 7/0452; H04B 7/0613; H04B 7/04;
(Continued)

(56) References Cited

U.S. PATENT DOCUMENTS 8,331,310 B2 * 12/2012 Wang ................... H04B 7/0413
 370/330
8,483,742 B2 * 7/2013 Kim ....................... H04W 52/12
 370/252

(Continued)

OTHER PUBLICATIONS

Zhang et al., Preamble Structure for 11 ax system, doc.:IEEE 802.11-15/0101r1, Jan. 2015, IEEE.*
Stacey, IEEE P802.11 Wireless LANs, Specification Framesork for TGax, doc.:IEEE 802.11-15/0132r4, Mar. 27, 2015, IEEE.*
Son et al., HE Trigger Frame Format, doc.: IEEE 802.11-15/0851r0, Jul. 13, 2015, IEEE.*
Merlin et al., Trigger Frame Format, doc.:IEEE 802.11-15/0877r1, Jul. 13, 2015, IEEE.*

(Continued)

*Primary Examiner* — Benjamin H Elliott, IV
*Assistant Examiner* — Eric Nowlin

(57) ABSTRACT

An Acknowledgment (ACK) method is provided by a receiving device in a Wireless Local Area Network (WLAN). The receiving device receives a plurality of data units having a plurality of Traffic Identifiers (TIDs) and transmits an ACK frame including a plurality of ACK information fields for at least part of the plurality of data units. An ACK information field for a data unit satisfying a first condition among the plurality of ACK information fields includes a Traffic Identifier (TID) and a block ACK bitmap indicating whether the data unit has been successfully received. An ACK information field for a data unit satisfying a second condition and having been successfully received among the plurality of ACK information fields includes the first TID and does not include a block ACK bitmap.

16 Claims, 25 Drawing Sheets

(51) Int. Cl.
    *H04L 1/16*      (2006.01)
    *H04L 5/00*      (2006.01)
    *H04W 84/12*     (2009.01)

(52) U.S. Cl.
    CPC .......... *H04L 1/0059* (2013.01); *H04L 1/0071* (2013.01); *H04L 1/0643* (2013.01); *H04W 84/12* (2013.01)

(58) Field of Classification Search
    CPC .. H04B 7/0617; H04B 7/0626; H04B 7/0697; H04W 72/0413; H04W 72/042; H04W 72/12; H04W 74/06; H04W 84/12; H04W 88/08; H04W 72/04; H04W 74/08; H04L 1/0031; H04L 1/0057; H04L 1/0059; H04L 1/0071; H04L 1/0643; H04L 1/1621; H04L 1/1887; H04L 5/0007; H04L 5/0037; H04L 25/0204; H04L 2001/0093; H04L 2025/03426; H04L 5/0023; H04L 5/0044; H04L 5/0053
    See application file for complete search history.

(56) References Cited

U.S. PATENT DOCUMENTS

| | | | | |
|---|---|---|---|---|
| 8,571,010 | B1* | 10/2013 | Zhang | H04W 56/0005 370/230 |
| 8,737,329 | B2* | 5/2014 | Ogawa | H04L 5/0064 370/329 |
| 8,824,403 | B2* | 9/2014 | Oh | H04L 5/0092 370/252 |
| 8,903,441 | B2* | 12/2014 | Kim | H04B 7/0413 370/329 |
| 8,976,741 | B2* | 3/2015 | Wentink | H04W 72/1289 370/329 |
| 9,042,331 | B2* | 5/2015 | Lee | H04B 7/0452 370/329 |
| 9,065,502 | B2* | 6/2015 | Lee | H04L 5/0023 |
| 9,155,070 | B2* | 10/2015 | Yuk | H04W 72/04 |
| 9,232,502 | B2* | 1/2016 | Zhu | H04W 72/0406 |
| 9,325,463 | B2* | 4/2016 | Azizi | H04L 5/003 |
| 9,344,238 | B2* | 5/2016 | Vermani | H04L 5/0044 |
| 9,397,805 | B2* | 7/2016 | Vermani | H04L 5/0044 |
| 9,398,570 | B2* | 7/2016 | Lee | H04B 7/0452 |
| 9,439,192 | B2* | 9/2016 | Reznik | H04L 1/0025 |
| 9,467,994 | B2* | 10/2016 | Ogawa | H04L 5/0064 |
| 9,497,744 | B2* | 11/2016 | Husen | H04W 72/042 |
| 9,503,931 | B2* | 11/2016 | Vermani | H04L 27/0012 |
| 9,503,932 | B2* | 11/2016 | Vermani | H04L 27/0012 |
| 9,673,943 | B2* | 6/2017 | Seok | H04L 5/0007 |
| 2008/0193518 | A1* | 8/2008 | Zarkadas | A61K 9/1652 424/451 |
| 2010/0067480 | A1* | 3/2010 | Wang | H04B 7/0413 370/330 |
| 2010/0165985 | A1* | 7/2010 | Sharma | H04L 47/2425 370/389 |
| 2011/0002319 | A1* | 1/2011 | Husen | H04W 72/042 370/338 |
| 2011/0051636 | A1* | 3/2011 | Van Nee | H04B 7/0452 370/310 |
| 2011/0188482 | A1* | 8/2011 | Vermani | H04L 27/0012 370/338 |
| 2011/0310901 | A1* | 12/2011 | Uchida | H04L 43/026 370/392 |
| 2012/0020261 | A1* | 1/2012 | Van Zelst | H04L 5/003 370/310 |
| 2013/0023296 | A1* | 1/2013 | Kim | H04B 7/0413 455/509 |
| 2013/0114494 | A1* | 5/2013 | Yuk | H04W 72/04 370/312 |
| 2013/0250958 | A1* | 9/2013 | Watanabe | H04L 45/54 370/392 |
| 2014/0019639 | A1* | 1/2014 | Ueno | H04L 61/103 709/238 |
| 2014/0112298 | A1* | 4/2014 | Oh | H04L 5/0092 370/329 |
| 2014/0119288 | A1* | 5/2014 | Zhu | H04W 74/0816 370/329 |
| 2014/0140312 | A1* | 5/2014 | Lee | H04B 7/0452 370/329 |
| 2014/0195666 | A1* | 7/2014 | Dumitriu | H04L 12/4625 709/223 |
| 2014/0211715 | A1* | 7/2014 | Ogawa | H04L 5/0064 370/329 |
| 2014/0307612 | A1* | 10/2014 | Vermani | H04L 5/0044 370/312 |
| 2014/0307649 | A1* | 10/2014 | Vermani | H04L 5/0044 370/329 |
| 2014/0307650 | A1* | 10/2014 | Vermani | H04L 5/0044 370/329 |
| 2014/0337690 | A1* | 11/2014 | Zhang | H03M 13/2933 714/776 |
| 2014/0362857 | A1* | 12/2014 | Guichard | H04L 45/566 370/392 |
| 2015/0029996 | A1* | 1/2015 | Yuan | H04W 72/121 370/330 |
| 2015/0063258 | A1* | 3/2015 | Merlin | H04L 47/12 370/329 |
| 2015/0078368 | A1* | 3/2015 | Vermani | H04L 27/0012 370/338 |
| 2015/0139206 | A1* | 5/2015 | Azizi | H04L 5/003 370/338 |
| 2015/0215172 | A1* | 7/2015 | Kumar | H04L 43/026 709/223 |
| 2015/0327276 | A1* | 11/2015 | Rebeiz | H04W 72/0493 370/329 |
| 2015/0333930 | A1* | 11/2015 | Aysola | H04L 63/0471 370/392 |
| 2015/0334691 | A1* | 11/2015 | Ogawa | H04L 5/0064 370/329 |
| 2015/0365923 | A1* | 12/2015 | Vermani | H04W 72/042 370/329 |
| 2016/0014763 | A1* | 1/2016 | Jauh | H04B 7/0452 370/329 |
| 2016/0028452 | A1* | 1/2016 | Chu | H04J 11/00 375/267 |
| 2016/0056930 | A1* | 2/2016 | Seok | H04L 5/0026 370/330 |
| 2016/0057657 | A1* | 2/2016 | Seok | H04L 69/324 370/476 |
| 2016/0065467 | A1* | 3/2016 | Wu | H04L 65/60 370/392 |
| 2016/0088602 | A1* | 3/2016 | Seok | H04L 5/0055 370/338 |
| 2016/0100396 | A1* | 4/2016 | Seok | H04L 5/003 370/329 |
| 2016/0100408 | A1* | 4/2016 | Hedayat | H04L 65/4076 370/329 |
| 2016/0105836 | A1* | 4/2016 | Seok | H04W 36/32 370/331 |
| 2016/0113009 | A1* | 4/2016 | Seok | H04B 7/0452 370/329 |
| 2016/0113034 | A1* | 4/2016 | Seok | H04W 74/04 370/329 |
| 2016/0128057 | A1* | 5/2016 | Seok | H04L 5/0055 370/329 |
| 2016/0143010 | A1* | 5/2016 | Kenney | H04W 4/008 370/330 |
| 2016/0143026 | A1* | 5/2016 | Seok | H04W 72/0413 370/329 |
| 2016/0150505 | A1* | 5/2016 | Hedayat | H04W 72/1289 370/329 |
| 2016/0164776 | A1* | 6/2016 | Biancaniello | H04L 45/306 370/392 |
| 2016/0165482 | A1* | 6/2016 | Yang | H04L 27/2613 370/336 |
| 2016/0174200 | A1* | 6/2016 | Seok | H04W 72/04 370/329 |

(56) References Cited

U.S. PATENT DOCUMENTS

| | | | |
|---|---|---|---|
| 2016/0198445 A1* | 7/2016 | Ghosh | H04L 5/00 370/329 |
| 2016/0212246 A1* | 7/2016 | Seok | H04L 69/323 |
| 2016/0241315 A1* | 8/2016 | Kwon | H04B 7/0452 |
| 2016/0242177 A1* | 8/2016 | Seok | H04W 72/0446 |
| 2016/0249397 A1* | 8/2016 | Seok | H04W 76/023 |
| 2016/0285526 A1* | 9/2016 | Hedayat | H04B 7/0452 |
| 2016/0302185 A1* | 10/2016 | Sun | H04W 74/08 |
| 2016/0309478 A1* | 10/2016 | Nabetani | H04B 7/0697 |
| 2016/0315675 A1* | 10/2016 | Seok | H04B 7/0452 |
| 2016/0330714 A1* | 11/2016 | Hedayat | H04W 72/1289 |
| 2016/0330715 A1* | 11/2016 | Chen | H04L 27/2607 |
| 2016/0330732 A1* | 11/2016 | Moon | H04B 7/0617 |
| 2016/0345328 A1* | 11/2016 | Reznik | H04L 1/0025 |
| 2016/0366254 A1* | 12/2016 | Asterjadhi | H04L 69/324 |
| 2016/0380731 A1* | 12/2016 | Kim | H04L 5/0007 370/329 |
| 2017/0026952 A1* | 1/2017 | Park | H04W 76/00 |
| 2017/0041945 A1* | 2/2017 | Ogawa | H04L 5/0064 |
| 2017/0048823 A1* | 2/2017 | Bharadwaj | H04W 72/042 |
| 2017/0048844 A1* | 2/2017 | Chen | H04W 72/0413 |
| 2017/0048890 A1* | 2/2017 | Sun | H04W 74/08 |
| 2017/0077999 A1* | 3/2017 | Asterjadhi | H04B 7/024 |
| 2017/0104659 A1* | 4/2017 | Suh | H04B 7/0619 |
| 2017/0127385 A1* | 5/2017 | Vermani | H04B 7/0626 |
| 2017/0170937 A1* | 6/2017 | Chun | H04L 5/0048 |

OTHER PUBLICATIONS

IEEE Std 802.11ac-2013, Part 11: Wireless LAN Medium Access Control (MAC) and Physical Layer (PHY) Specifications, Amendment 4: Enhancements for Very High Throughput for Operation in Bands below 6 GHz.*

Van Nee et al., "UL MU-MIMO for 11ac," IEEE 802.11-09/0852-00-00ac, Jul. 2009, pp. 1-10.*

"Part 11: Wireless LAN Medium Access Control (MAC) and Physical Layer (PHY) Specifications", IEEE Standards 802.11™-2012 (Revision of IEEE Standard 802.11-2007), Mar. 29, 2012, pp. 1-2695, IEEE (The Institute of Electrical and Electronic Engineers, Inc.), New York, NY, USA.

"Part 11: Wireless LAN Medium Access Control (MAC) and Physical Layer (PHY) Specifications, Amendment 4: Enhancements for Very High Throughput for Operation in Bands below 6 GHz", IEEE Standards 802.11ac™-2013, 2013, pp. 1-395, IEEE (The Institute of Electrical and Electronic Engineers, Inc.), New York, NY, USA.

"Part 11: Wireless LAN Medium Access Control (MAC) and Physical Layer (PHY) Specifications, Amendment 2: Sub 1 GHz License Exempt Operation", IEEE P802.11ah™/D5.0, Mar. 2015, pp. 1-604, IEEE (The Institute of Electrical and Electronic Engineers, Inc.), New York, NY, USA.

\* cited by examiner

ACKNOWLEDGEMENT METHOD AND MULTI USER TRANSMISSION METHOD

CROSS-REFERENCE TO RELATED APPLICATION

This application claims priority to and the benefit of U.S. Provisional Application Nos. 61/975,622 and 61/981,427, filed on Apr. 4, 2014 and Apr. 18, 2014 in the U.S. Patent and Trademark Office, the entire contents of which are incorporated herein by reference.

BACKGROUND (a) Field

The described technology relates generally to an acknowledgement (ACK) method and an uplink multi-user transmission method. More particularly, the described technology relates generally to an acknowledgement (ACK) method and an uplink multi-user transmission method in a wireless local area network (WLAN).

(b) Description of the Related Art

In a WLAN, data are transmitted and received by using unlicensed band such as 2.4 GHz or 5 GHz. The WLAN is being standardized by the IEEE (Institute of Electrical and Electronics Engineers) Part 11 under the name of "Wireless LAN Medium Access Control (MAC) and Physical Layer (PHY) Specifications."

After an original standard was published on 1999, new version standards are continuously published by amendments. The IEEE standard 802.11a (IEEE Std 802.11a-1999) supporting 2.4 GHz band was published on 1999, and the IEEE standard 802.11g (IEEE Std 802.11g-2003) supporting 5 GHz band was published on 2003. These standards are called legacy. Subsequently, the IEEE standard 802.11n (IEEE Std 802.11n-2009) for enhancements for higher throughput (HT) was published on 2009, and the IEEE standard 802.11ac (IEEE 802.11ac-2013) for enhancements for very high throughput (VHT) was published on 2013. Recently, a high efficiency WLAN (HEW) for enhancing the system throughput in high density scenarios is being developed by the IEEE 802.11 ax task group.

A multiple input multiple output (MIMO) has been introduced by the HT WLAN, and a downlink multi-user MIMO (MU-MIMO) has been introduced by the VHT WLAN. Accordingly, a transmitting device with multiple antennas can simultaneously transmit downlink data to a plurality of receiving devices. However, an uplink MU-MIMO has not been introduced by the previous WLANs, but the HEW or a later WLAN may use the uplink MU-MIMO such that a plurality of transmitting devices can simultaneously transmit data to a single receiving device.

The HEW or later WLAN may use a scheme such as an orthogonal frequency division multiple access (OFDMA) for simultaneously transmitting data to a plurality of devices or for data being simultaneously transmitted by the plurality of devices.

A single physical layer convergence procedure (PLCP) protocol data unit (PPDU) including MAC protocol data units (MPDUs) having a plurality of access categories (ACs) can be transmitted in the VHT WLAN. In this case, an MPDU corresponding to one AC is transmitted to a single receiving device. However, the single device may receive MPDUs having the plurality of ACs in the HEW or later WLAN.

As such, since the single device may simultaneously receive data from the plurality of devices or may receive data with the plurality of ACs in the HEW or later WLAN, an ACK procedure for the received data is required.

SUMMARY

An embodiment of the present invention provides an ACK method for acknowledging data received from a plurality of devices or data with a plurality of ACs and an uplink multi-user transmission method for transmitting uplink data by a plurality of devices.

According to another embodiment, a method of receiving an ACK is provided by a first transmitting device in a WLAN. The method includes transmitting a first data unit having a first traffic identifier (TID) when a plurality of data units, having a plurality of TIDs respectively, are transmitted by a plurality of transmitting devices including the first transmitting device. The method further includes receiving an ACK frame including a plurality of ACK information fields for at least part of the plurality of data units. When the first data unit satisfies a first condition, an ACK information field for the first data unit among the plurality of ACK information fields includes the first TID and a block ACK bitmap indicating whether the first data unit has been successfully received. When the first data unit satisfies a second condition and has been successfully received, an ACK information field for the first data unit among the plurality of ACK information fields includes the first TID and does not include a block ACK bitmap.

The first condition may be a condition that a data unit includes no single MAC (medium access protocol) protocol data unit (MPDU), and the second condition may be a condition that a data unit includes a single MPDU.

An ACK information field for a data unit satisfying the first condition among the plurality of ACK information fields may further include block ACK starting sequence control information. The block ACK starting sequence control information may indicate a sequence number of the first MPDU among a plurality of MPDUs included in the data unit, and a plurality of bits in the block ACK bitmap may indicate whether the plurality of MPDUs have been successfully received in an order of sequence number.

The ACK frame may further include identification information of the plurality of transmitting devices.

The identification information of each transmitting device may be included in a corresponding ACK information field among the plurality of ACK information fields.

When the first data unit satisfies the second condition and has been not successfully received, the ACK frame may not include the first TID.

According to yet another embodiment, an ACK receiving apparatus of a first transmitting device is provided in a WLAN. The ACK receiving apparatus includes a processor and a transceiver. The processor generates a first data unit having a first TID. The transceiver transmits the first data unit when a plurality of data units, having a plurality of TIDs respectively, are transmitted by a plurality of transmitting devices including the first transmitting device. The transceiver receives an ACK frame including a plurality of ACK information fields for at least part of the plurality of data units. When the first data unit satisfies a first condition, an ACK information field for the first data unit among the plurality of ACK information fields includes the first TID and a block ACK bitmap indicating whether the first data unit has been successfully received. When the first data unit satisfies a second condition and has been successfully received, an ACK information field for the first data unit among the plurality of ACK information fields includes the first TID and does not include a block ACK bitmap.

According to yet another embodiment of the present invention, an ACK method is provided by a receiving device in a WLAN. The method includes receiving a plurality of data units having a plurality of TIDs respectively, and transmitting an ACK frame including a plurality of ACK information fields for at least part of the plurality of data units. An ACK information field for a data unit satisfying a first condition among the plurality of ACK information fields includes a TID and a block ACK bitmap indicating whether the data unit has been successfully received. An ACK information field for a data unit satisfying a second condition and having been successfully received among the plurality of ACK information fields includes the first TID and does not include a block ACK bitmap.

The first condition may be a condition that a data unit includes no MPDU, and the second condition may be a condition that a data unit includes a single MPDU.

The ACK information field for the data unit satisfying the first condition among the plurality of ACK information fields may further include block ACK starting sequence control information. The block ACK starting sequence control information may indicate a sequence number of the first MPDU among a plurality of MPDUs included in the data unit, and a plurality of bits in the block ACK bitmap may indicate whether the plurality of MPDUs have been successfully received in an order of sequence number.

Receiving the plurality of data units may include receiving the plurality of data units from the plurality of transmitting devices, respectively.

The ACK frame may further include identification information of the plurality of transmitting devices.

The identification information of each transmitting device may be included in a corresponding ACK information field among the plurality of ACK information fields.

The ACK frame may not include a TID of a data unit satisfying the second condition and having been not successfully received.

According to still another embodiment of the present invention, an ACK apparatus of a receiving device is provided in a WLAN. The ACK apparatus includes a processor and a transceiver. The transceiver receives a plurality of data units having a plurality of TIDs respectively, and transmits an ACK frame. The processor generates the ACK frame including a plurality of ACK information fields for at least part of the plurality of data units. An ACK information field for a data unit satisfying a first condition among the plurality of ACK information fields includes a TID and a block ACK bitmap indicating whether the data unit has been successfully received. An ACK information field for a data unit satisfying a second condition and having been successfully received among the plurality of ACK information fields includes the first TID and does not include a block ACK bitmap.

According to further embodiment of the present invention, a method of receiving an ACK is provided by a transmitting device in a WLAN. The method includes transmitting a data unit having a TID and receiving an AKC frame including an ACK information field. When the data unit satisfies a first condition, the ACK information field includes the TID and a block ACK bitmap indicating whether the data unit has been successfully received. When the data unit satisfies a second condition and has been successfully received, the ACK information includes the TID and does not include a block ACK bitmap.

The first condition may be a condition that the data unit includes no single MPDU, and the second condition may be a condition that the data unit includes a single MPDU.

When the ACK information field satisfies the first condition, the ACK information field may further include block ACK starting sequence control information. The block ACK starting sequence control information may indicate a sequence number of the first MPDU among a plurality of MPDUs included in the data unit, and a plurality of bits in the block ACK bitmap may indicate whether the plurality of MPDUs have been successfully received in an order of sequence number.

The ACK frame may further include identification information of the transmitting device.

According to further embodiment of the present invention, an ACK receiving apparatus of a transmitting device is provided in a WLAN. The ACK receiving apparatus includes a processor and a transceiver. The processor generates a data unit having a TID. The transceiver transmits the data unit and receives an AKC frame including an ACK information field. When the data unit satisfies a first condition, the ACK information field includes the TID and a block ACK bitmap indicating whether the data unit has been successfully received. When the data unit satisfies a second condition and has been successfully received, the ACK information includes the TID and does not include a block ACK bitmap.

According to further embodiment of the present invention, an ACK method is provided by a receiving device in a WLAN. The method includes receiving a data unit having a TID and transmitting an ACK frame including an ACK information field. When the data unit satisfies a first condition, the ACK information field includes the TID and a block ACK bitmap indicating whether the data unit has been successfully received. When the data unit satisfies a second condition and has been successfully received, the ACK information includes the TID and does not include a block ACK bitmap.

The first condition may be a condition that the data unit includes no MPDU, and the second condition may be a condition that the data unit includes a single MPDU.

When the ACK information field satisfies the first condition, the ACK information field may further include block ACK starting sequence control information. The block ACK starting sequence control information may indicate a sequence number of the first MPDU among a plurality of MPDUs included in the data unit, and a plurality of bits in the block ACK bitmap may indicate whether the plurality of MPDUs have been successfully received in an order of sequence number.

The ACK frame may further include identification information of the transmitting device.

According to further embodiment of the present invention, an ACK apparatus of a receiving device is provided in a WLAN. The ACK apparatus includes a processor and a transceiver. The transceiver receives a data unit having a TID and transmits an ACK frame. The processor generates the ACK frame including an ACK information field. When the data unit satisfies a first condition, the ACK information field includes the TID and a block ACK bitmap indicating whether the data unit has been successfully received. When the data unit satisfies a second condition and has been successfully received, the ACK information includes the TID and does not include a block ACK bitmap.

According to further embodiment of the present invention, a multi-user transmission method is provided by an access point in a WLAN. The method includes transmitting an initiation frame indicating an initiation of uplink multi-user transmission, receiving a plurality of data frames from a plurality of stations, respectively, and transmitting an ACK frame indicating whether the plurality of data frames have been successfully received.

The initiation frame, the data frames, and the ACK frame may be transmitted on an unlicensed band.

An interval between temporally consecutive frames in a plurality of frames including the initiation frame, the data frames, and the ACK frame may be an SIFS (short inter-frame space) interval defined in a WLAN standard.

The ACK frame may include information for identifying each station and a block ACK bitmap for indicating whether the data frame transmitted by each station has been successfully received, and the block ACK bitmap may be provided for each station.

The ACK frame may further include block ACK starting sequence control information for each station. The block ACK starting sequence control information may indicate a sequence number of the first MPDU among a plurality of MPDUs included in a data frame transmitted by a corresponding station, and each bit in the block ACK bitmap may indicate whether the MPDU has successfully received in an order of sequence number.

The ACK frame may further include information for identifying a station that has transmitted a data frame which has been successfully received from among the plurality of stations.

The method may further include sequentially receiving request frame including feedback information from the plurality of stations as a response of the initiation frame, and transmitting a setup frame including setup information for the uplink multi-user transmission to at least part of the plurality of stations as a response of the request frame.

The feedback information may include transmission power information.

The setup information may include information that is common to the at least part of the plurality of stations and dedicate information that is specific to each of the at least part of the plurality of stations, for the uplink multi-user transmission.

According to further embodiment of the present invention, a multi-user transmission apparatus of an access point is provided in a WLAN. The multi-user transmission apparatus includes a processor and a transceiver. The transceiver received a plurality of data frames and transmits an ACK frame. The transceiver transmits an initiation frame indicating an initiation of uplink multi-user transmission, and receives a plurality of data frames from a plurality of stations, respectively. The processor generates an ACK frame indicating whether the plurality of data frames have been successfully received, and the transceiver transmits the ACK frame.

According to further embodiment of the present invention, a multi-user transmission method is provided by a station in a WLAN. The method includes receiving an initiation frame indicating an initiation of uplink multi-user transmission, transmitting a data frame, and receiving an ACK frame indicating whether a plurality of data frames including the data frame have been successfully received. The plurality of data frames are transmitted by a plurality of stations including the station, respectively.

According to further embodiment of the present invention, an ACK apparatus of a station is provided in a WLAN. The ACK apparatus includes a processor and a transceiver. The transceiver receives an initiation frame indicating an initiation of uplink multi-user transmission, and the processor generates a data frame. The transceiver transmits the data frame, and receives an ACK frame indicating whether a plurality of data frames including the data frame have been successfully received. The plurality of data frames are transmitted by a plurality of stations including the station, respectively.

DETAILED DESCRIPTION OF THE EMBODIMENTS

Figure 1:
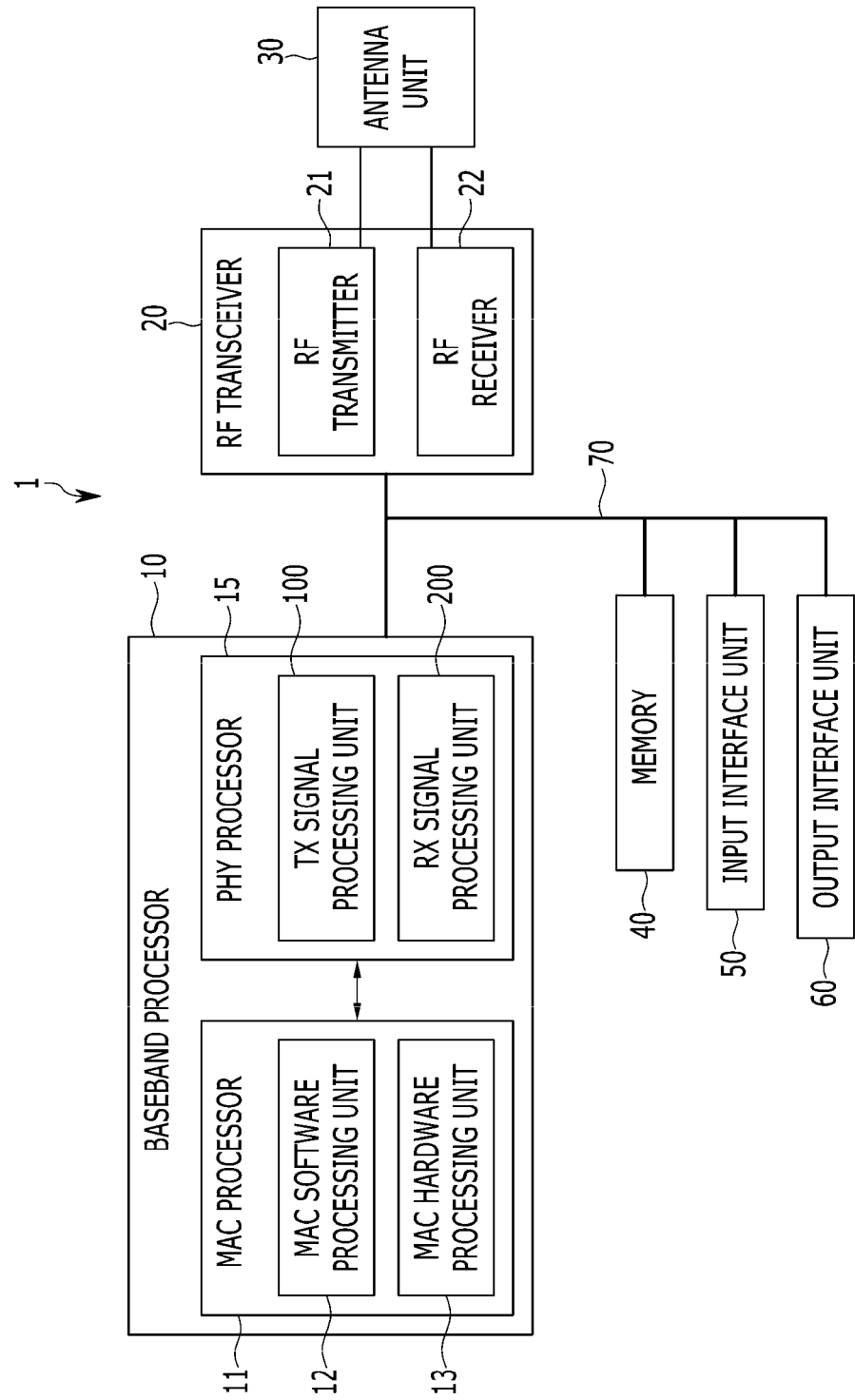
FIG. 1 is a schematic block diagram exemplifying a WLAN device.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In a wireless local area network (WLAN), a basic service set (BSS) includes a plurality of WLAN devices. The WLAN device may include a medium access control (MAC) layer and a physical (PHY) layer according to the IEEE (Institute of Electrical and Electronics Engineers) standard 802.11. The plurality of WLAN devices may include a WLAN device that is an access point and the other WLAN devices that are non-AP stations (non-AP STAs). Alternatively, all the plurality of WLAN devices may be non-AP STAs in Ad-hoc networking. In general, the AP STA and the non-AP STA may be collectively called the STA. However, for easy description, only the non-AP STA may be called the STA.

FIG. 1 is a schematic block diagram exemplifying a WLAN device.

Referring to FIG. 1, the WLAN device 1 includes a baseband processor 10, a radio frequency (RF) transceiver 20, an antenna unit 30, a memory 40, an input interface unit 50, an output interface unit 60, and a bus 70.

The baseband processor 10 performs baseband signal processing, and includes a MAC processor 11 and a PHY processor 15.

In one embodiment, the MAC processor 11 may include a MAC software processing unit 12 and a MAC hardware processing unit 13. The memory 40 may store software (hereinafter referred to as "MAC software") including at least some functions of the MAC layer. The MAC software processing unit 12 executes the MAC software to implement the some functions of the MAC layer, and the MAC hardware processing unit 13 may implement remaining functions of the MAC layer as hardware (hereinafter referred to "MAC hardware"). However, the MAC processor 11 is not limited to this.

The PHY processor 15 includes a transmitting signal processing unit 100 and a receiving signal processing unit 200.

The baseband processor 10, the memory 40, the input interface unit 50, and the output interface unit 60 may communicate with each other via the bus 70.

The RF transceiver 20 includes an RF transmitter 21 and an RF receiver 22.

The memory 40 may further store an operating system and applications. The input interface unit 50 receives information from a user, and the output interface unit 60 outputs information to the user.

The antenna unit 30 includes one or more antennas. When multiple-input multiple-output (MIMO) or multi-user MIMO (MU-MIMO) is used, the antenna unit 30 may include a plurality of antennas.

Figure 2:
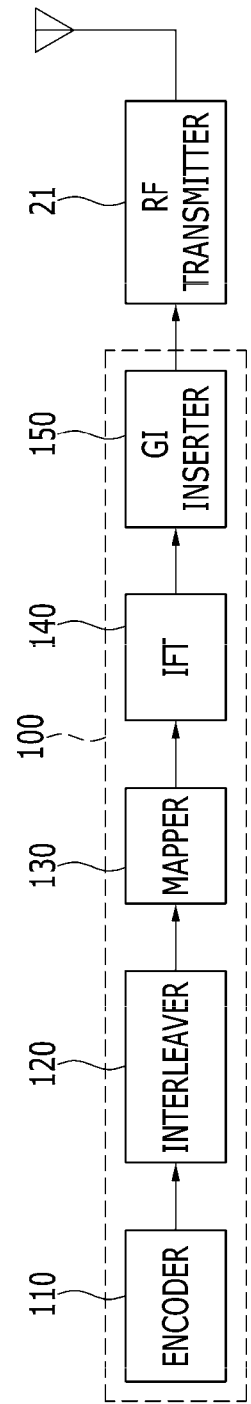
FIG. 2 is a schematic block diagram exemplifying a transmitting signal processor in a WLAN.

FIG. 2 is a schematic block diagram exemplifying a transmitting signal processor in a WLAN.

Referring to FIG. 2, a transmitting signal processing unit 100 includes an encoder 110, an interleaver 120, a mapper 130, an inverse Fourier transformer (IFT) 140, and a guard interval (GI) inserter 150.

The encoder 110 encodes input data. For example, the encoder 100 may be a forward error correction (FEC) encoder. The FEC encoder may include a binary convolutional code (BCC) encoder followed by a puncturing device, or may include a low-density parity-check (LDPC) encoder.

The transmitting signal processing unit 100 may further include a scrambler for scrambling the input data before the encoding to reduce the probability of long sequences of 0s or 1s. If BCC encoding is used in the encoder, the transmitting signal processing unit 100 may further include an encoder parser for demultiplexing the scrambled bits among a plurality of BCC encoders. If LDPC encoding is used in the encoder, the transmitting signal processing unit 100 may not use the encoder parser.

The interleaver 120 interleaves the bits of each stream output from the encoder to change order of bits. Interleaving may be applied only when BCC encoding is used. The mapper 130 maps the sequence of bits output from the interleaver to constellation points. If the LDPC encoding is used in the encoder, the mapper 130 may further perform LDPC tone mapping besides the constellation mapping.

When the MIMO or the MU-MIMO is used, the transmitting signal processing unit 100 may use a plurality of interleavers 120 and a plurality of mappers corresponding to the number of $N_{SS}$ of spatial streams. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When the MIMO or the MU-MIMO is used, the transmitting signal processing unit 100 may insert cyclic shift diversities (CSDs) to prevent unintentional beamforming. The CSD insertion may occur before or after the inverse Fourier transform. The CSD may be specified per transmit chain or may be specified per space-time stream. Alternatively, the CSD may be applied as a part of the spatial mapper.

When the MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When the MIMO or the MU-MIMO is used, the GI inserter 150 and the RF transmitter 21 may be provided for each transmit chain.

Figure 3:
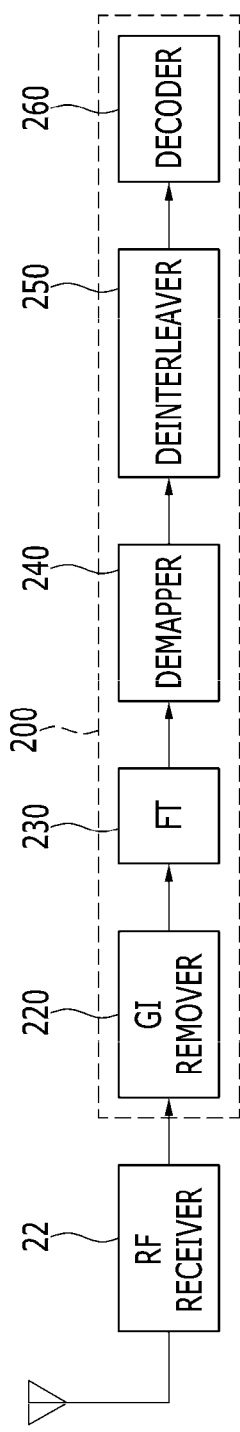
FIG. 3 is a schematic block diagram exemplifying a receiving signal processing unit in the WLAN.

FIG. 3 is a schematic block diagram exemplifying a receiving signal processing unit in the WLAN.

Referring to FIG. 3, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into the symbols. The GI remover 220 removes the GI from the symbol. When the MIMO or the MU-MIMO is used, the RF receiver 22 and the GI remover 220 may be provided for each receive chain.

The FT 230 converts the symbol (i.e., the time domain block) into a block of the constellation points by using a discrete Fourier transform (DFT) or a fast Fourier transform (FFT). The Fourier transformer 230 may be provided for each receive chain.

When the MIMO or the MU-MIMO is used, the receiving signal processing unit 200 may a spatial demapper for converting the Fourier transformed receiver chains to constellation points of the space-time streams, and an STBC decoder for despreading the constellation points from the space-time streams into the spatial streams.

The demapper 240 demaps the constellation points output from the Fourier transformer 230 or the STBC decoder to the bit streams. If the LDPC encoding is used, the demapper 240 may further perform LDPC tone demapping before the constellation demapping. The deinterleaver 250 deinterleaves the bits of each stream output from the demapper 240. Deinterleaving may be applied only when BCC encoding is used.

When the MIMO or the MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder, the receiving signal processing unit 200 may further include an encoder deparser for multiplexing the data decoded by a plurality of BCC decoders. If LDPC decoding is used in the decoder, the receiving signal processing unit 100 may not use the encoder deparser.

Figure 4:
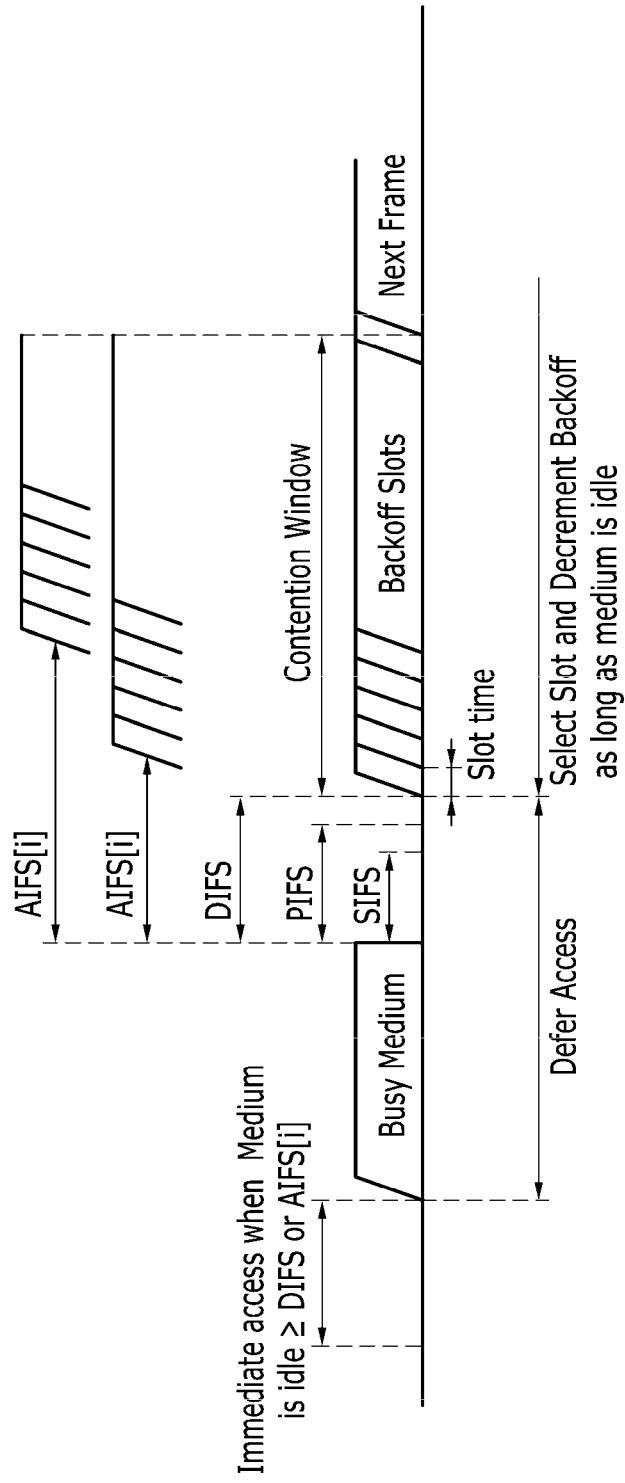
FIG. 4 exemplifies IFS relationships.

FIG. 4 exemplifies interframe space (IFS) relationships.

A data frame, a control frame, or a management frame may be exchanged between WLAN devices.

The data frame is used for transmission of data forwarded to a higher layer. The WLAN device transmits the data frame after performing backoff if a distributed coordination function IFS (DIFS) has elapsed from a time when the medium has been idle. The management frame is used for exchanging management information which is not forwarded to the higher layer. Subtype frames of the management frame include a beacon frame, an association request/response frame, a probe request/response frame, and an authentication request/response frame. The control frame is used for controlling access to the medium. Subtype frames of the control frame include a request to send (RTS) frame, a clear to send (CTS) frame, and an acknowledgement (ACK) frame. In the case that the control frame is not a response frame of the other frame, the WLAN device transmits the control frame after performing backoff if the DIFS has elapsed. In the case that the control frame is the response frame of the other frame, the WLAN device transmits the control frame without performing backoff if a short IFS (SIFS) has elapsed. The type and subtype of frame may be identified by a type field and a subtype field in a frame control field.

On the other hand, a Quality of Service (QoS) STA may transmit the frame after performing backoff if an arbitration IFS (AIFS) for access category (AC), i.e., AIFS[AC], has elapsed. In this case, the data frame, the management frame, or the control frame which is not the response frame may use the AIFC[AC].

Figure 5:
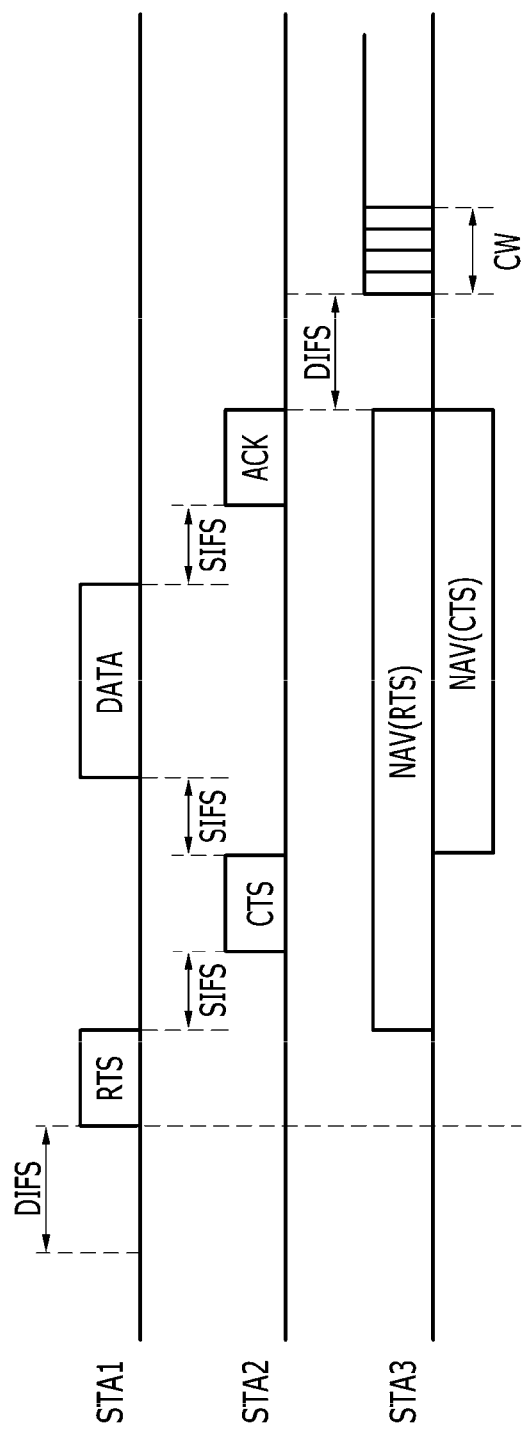
FIG. 5 is a schematic diagram explaining CSMA/CA based frame transmission procedure for avoiding collision between frames in a channel.

FIG. 5 is a schematic diagram explaining a CSMA (carrier sense multiple access)/CA (collision avoidance) based frame transmission procedure for avoiding collision between frames in a channel.

Referring to FIG. 5, STA1 is a transmit WLAN device for transmitting data, STA2 is a receive WLAN device for receiving the data, and STA3 is a WLAN device which may be located at an area where a frame transmitted from the STA1 and/or a frame transmitted from the STA2 can be received by the WLAN device.

The STA1 may determine whether the channel is busy by carrier sensing. The STA1 may determine the channel occupation based on an energy level on the channel or correlation of signals in the channel, or may determine the channel occupation by using a network allocation vector (NAV) timer.

When determining that the channel is not used by other devices during DIFS (that is, the channel is idle), the STA1 may transmit an RTS frame to the STA2 after performing backoff. Upon receiving the RTS frame, the STA2 may transmit a CTS frame as a response of the CTS frame after SIFS.

When the STA3 receives the RTS frame, it may set the NAV timer for a transmission duration of subsequently transmitted frames (for example, a duration of SIFS+CTS frame duration+SIFS+data frame duration+SIFS+ACK frame duration) by using duration information included in the RTS frame. When the STA3 receives the CTS frame, it may set the NAV timer for a transmission duration of subsequently transmitted frames (for example, a duration of SIFS+data frame duration+SIFS+ACK frame duration) by using duration information included in the RTS frame. Upon receiving a new frame before the NAV timer expires, the STA3 may update the NAV timer by using duration information included in the new frame. The STA3 does not attempt to access the channel until the NAV timer expires.

When the STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, the STA3 may determine whether the channel is busy by the carrier sensing. Upon determining that the channel is not used by the other devices during DIFS after the NAV timer has expired, the STA3 may attempt the channel access after a contention window according to random backoff elapses.

Now, a signaling method in a wireless communication network according to various embodiments of the present invention is described with reference to the drawings.

Figure 6:
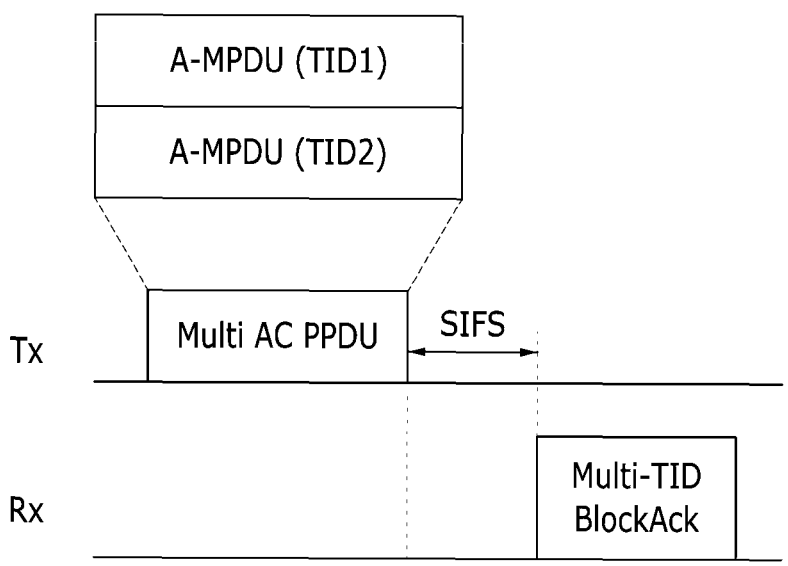
FIG. 6, FIG. 8, and FIG. 10 exemplify an ACK procedure in a wireless communication network according to embodiments of the present invention.
Figure 7:
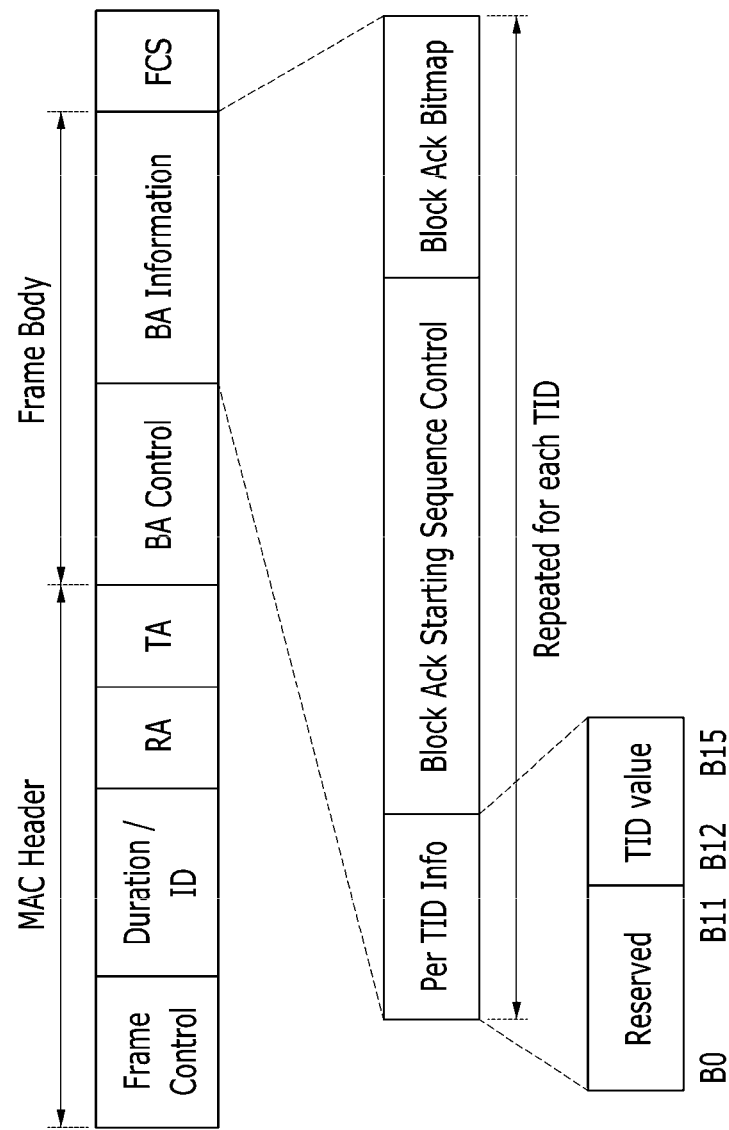
FIG. 7, FIG. 9, and FIG. 11 exemplify an ACK frame in a wireless communication network according to embodiments of the present invention.
Figure 8:
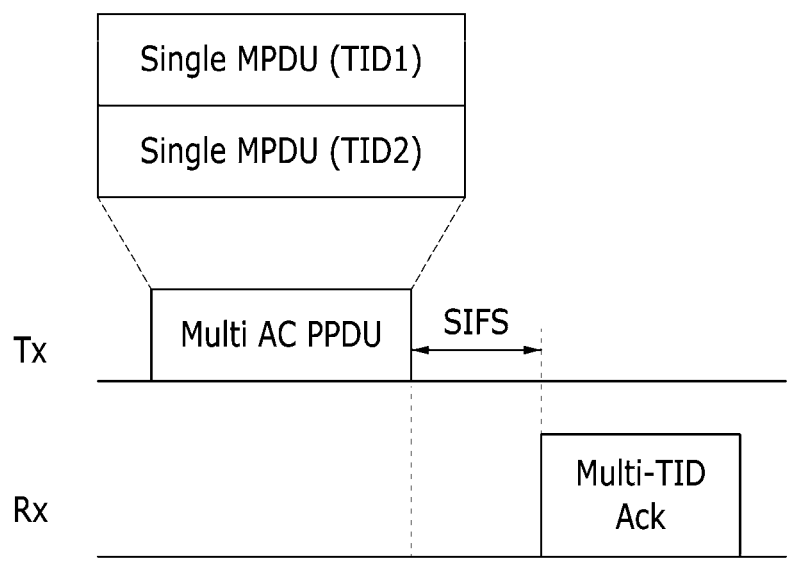
Figure 9:
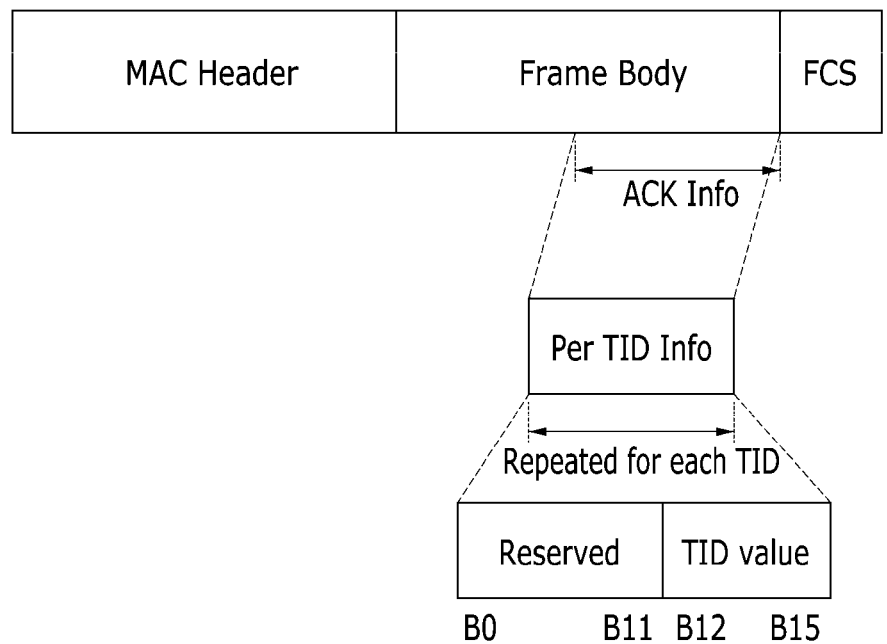
Figure 10:
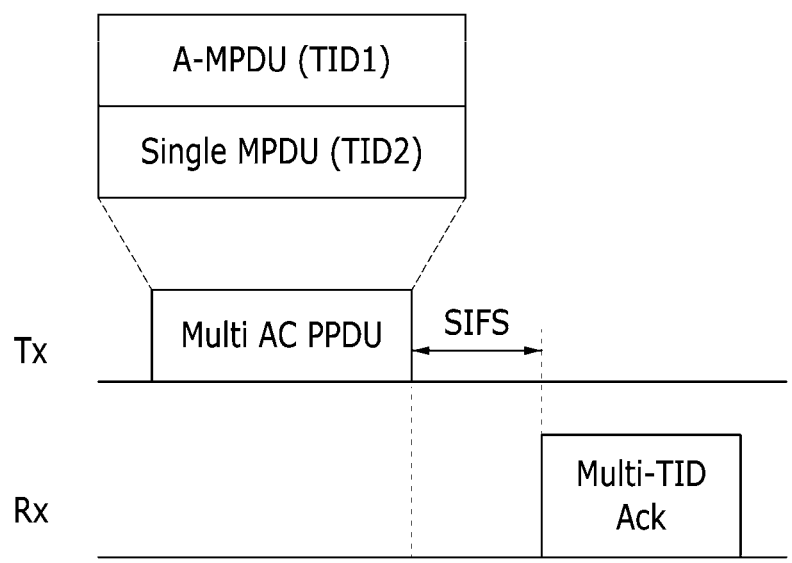
Figure 11:
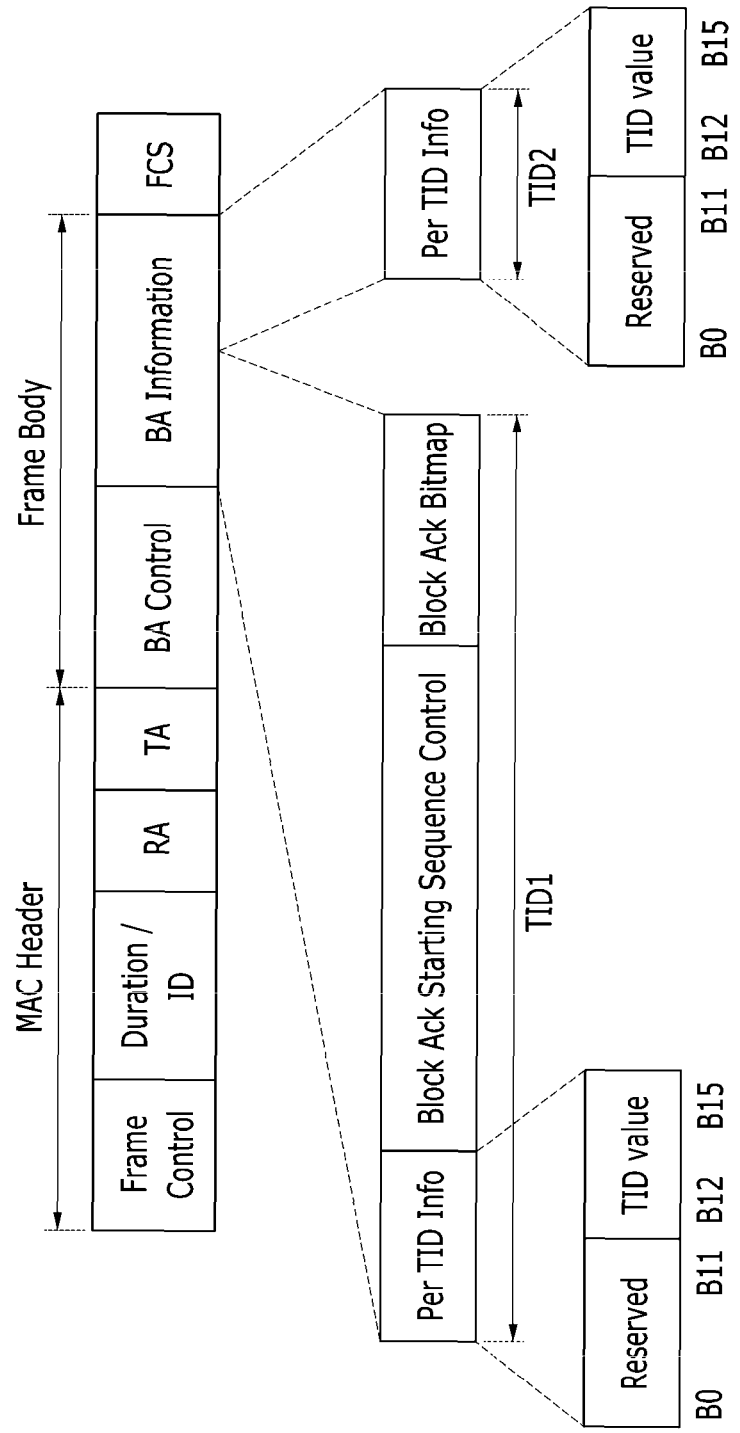

FIG. 6, FIG. 8, and FIG. 10 exemplify an ACK procedure in a wireless communication network according to embodiments of the present invention, and FIG. 7, FIG. 9, and FIG. 11 exemplify an ACK frame in a wireless communication network according to embodiments of the present invention.

Referring to FIG. 6, FIG. 8, and FIG. 10, a transmitting device transmits a PHY frame, for example a PLCP (physical layer convergence procedure) protocol data unit (PPDU).

The PPDU is a multi-AC PPDU corresponding to a plurality of access categories (ACs). The multi-AC PPDU includes a plurality of aggregate MAC protocol data units (A-MPDUs) that correspond to the plurality of ACs, respectively. Each A-MPDU may include a single MPDU or may include a plurality of MPDUs. One example of the single MPDU may be a VHT single MPDU defined in the IEEE Std 802.11ac. In the IEEE Std 802.11ac, an MPDU that is the only MPDU in an A-MPDU and is carried in an A-MPDU with an end-of-frame (EOF) subfield set to 1 is called a "VHT single MPDU." In one embodiment, the multi-AC PPDU may, as shown in FIG. 6, include a plurality of A-MPDUs each including no single MPDU. In another embodiment, the multi-AC PPDU may, as shown in FIG. 8, include a plurality of A-MPDUs each including a single MPDU. In yet another embodiment, the multi-AC PPDU may, as shown in FIG. 10, include a plurality of A-MPDUs. The plurality of A-MPDUs includes an A-MPDU including a single MPDU and an A-MPDU including no single MPDU.

In some embodiments, the AC corresponds to a traffic identifier (TID). The TID associates the MPDU with an appropriate AC. Hereinafter, the AC is described as the TID for convenience.

Referring to FIG. 6 again, a transmitting device may transmit a PPDU including A-MPDUs for the plurality of ACs. FIG. 6 shows an example where the PPDU includes an A-MPDU to which "TID1" is assigned as the TID and an A-MPDU to which "TID2" is assigned as the TID. A receiving device receiving the PPDU transmits an ACK frame to the transmitting device after a predetermined IFS interval. The predetermined IFS may be an SIFS. Alternatively, the predetermined IFS may be an IFS having the different duration from the SIFS.

As shown in FIG. 7, the ACK frame is defined by using a multi-TID block ACK frame format that is defined for a power save multi-poll operation in the HT WLAN.

Referring to FIG. 7, the ACK frame includes an MAC header, a frame body field, and a frame check sequence (FCS) field like the multi-TID block ACK frame defined in the HT WLAN.

The MAC header includes an address field, and the address field may include a transmitter address (TA) field and a receiver address (RA) field. The MAC header may further include a frame control field and a duration/ID field. The FCS field includes a cyclic redundancy check (CRC). Since the MAC header and the FCS field are fields included in a control frame of a previous WLAN, detailed descriptions thereof are omitted.

The frame body field includes a block ACK (BA) information field. The BA information field has a variable length according to the number of TIDs and includes an information per TID (per TID info) subfield, a block ACK starting sequence control subfield, and a block ACK bitmap subfield, for each TID. The information per TID subfield, the block ACK starting sequence control subfield, and the block ACK bitmap subfield are repeated for each TID.

The information per TID subfield indicates a value of a corresponding TID. The information per TID subfield may have two octets whose first 12 bits B0-B11 are reserved and last 4 bits B12-B15 indicate the TID value.

The block ACK starting sequence control subfield includes a starting sequence number subfield. The starting sequence number subfield indicates a sequence number of the first MPDU, i.e., a MSDU or an aggregate MSDU (A-MSDU) included in the first MPDU, for which the ACK frame is sent. The block ACK starting sequence control subfield may have two octets whose last 12 bits B4-B15 correspond to the starting sequence number subfield. The first 4 bits B0-B3 of the block ACK starting sequence control subfield may correspond to a fragment number subfield set to 0.

The block ACK bitmap subfield includes a block ACK bitmap. Each bit that is equal to 1 in the block ACK bitmap acknowledges successful reception of an MPDU in the order of sequence number. The first bit of the Block ACK bitmap corresponds to the MPDU with the sequence number that matches the starting sequence number of the block ACK starting sequence control subfield. The bit position n of the block ACK bitmap, if equal to 1, indicates the successful reception of the MPDU with the sequence number equal to (a value of the block ACK starting sequence control subfield+n). The bit position n of the block ACK bitmap, if equal to 0, indicates that the MPDU with the sequence number equal to (a value of the block ACK starting sequence control subfield+n) has not been successfully received.

The first instance of the information per TID subfield, the block ACK starting sequence control subfield, and the block ACK bitmap subfield corresponds to the lowest TID value with subsequent instances ordered by increasing values of the information per TID subfield.

Accordingly, the receiving device receiving the multi-AC PPDU may set each bit of the block ACK bitmap according to whether MPDUs aggregated in the A-MPDU corresponding to the TID with the lowest TID value has been successfully received in the order of sequence number. Subsequently, the receiving device may set each bit of the block ACK bitmap according to whether MPDUs aggregated in the A-MPDU corresponding to the TID with the next TID value has been successfully received in the order of sequence number. Assuming that TID1 is less than TID2 in the example shown in FIG. 6, the receiving device may set the information per TID subfield, the block ACK starting sequence control subfield, and the block ACK bitmap subfield for TID1, and then may set the information per TID subfield, the block ACK starting sequence control subfield, and the block ACK bitmap subfield for TID2. The transmitting device receiving the multi-TID block ACK frame can identify whether the MPDUs aggregated in the A-MPDU have been successfully received based on the TID value and the block ACK bitmap.

In some embodiments, the frame body field may further include a BA control field for controlling the block ACK.

Referring to FIG. 8 again, the transmitting device may transmit a PPDU including single MPDUs for the plurality of ACs. FIG. 8 shows an example where the PPDU includes a single MPDU to which "TID1" is assigned as the TID and a single MPDU to which "TID2" is assigned as the TID. A receiving device receiving the PPDU transmits an ACK frame to the transmitting device after a predetermined IFS interval.

The ACK frame is a multi-TID ACK frame and uses a normal ACK not the block ACK as shown in FIG. 9.

Referring to FIG. 9, the multi-TID ACK includes an MAC header, a frame body field, and an FCS field.

The MAC header includes an address field. In some embodiments, the address field may not include a TA field and may include an RA field. The MAC header may further include a frame control field and a duration/ID field. The FCS field includes a CRC.

The frame body field includes a BA information field. The BA information field has a variable length according to the number of TIDs and includes information per TID (per TID info) subfield for each TID. The information per TID subfield is repeated for each TID. In some embodiments, the BA information field may include the information per TID subfields for TIDs of single MPDUs that have been successfully received. That is, the ACK may be transmitted for only the single MPDUs that have been successfully received. Differently from an embodiment shown in FIG. 7, the BA information field does not include a block ACK starting sequence control subfield and a block ACK bitmap subfield. Accordingly, the BA information field shown in FIG. 9 may be called an ACK information field. In some embodiments, the ACK frame may use a format that is a multi-TID block ACK frame format defined in the HT WLAN having an ACK information filed excluding a block ACK starting sequence control subfield and a block ACK bitmap subfield.

The information per TID subfield indicates information, for example a TID value, on a TID for which an ACK is transmitted The information per TID subfield may have two octets whose first 12 bits B0-B11 are reserved and last 4 bits B12-B15 indicate the TID value.

The first instance of the information per TID subfield corresponds to the lowest TID value from among TIDs for which the ACK is transmitted, with subsequent instances ordered by increasing values of the information per TID subfield.

Accordingly, the receiving device receiving the multi-AC PPDU may input TID values of single MPDUs, which have been successfully received from among single MPDUs corresponding to a plurality of TIDs, to the ACK information field in the increasing order of TID value. The transmitting device receiving the multi-TID ACK frame can identify whether the single MPDUs have been successfully received based on the TID values input to the ACK information field. If the information per TID subfield is transmitted for the single MPDU that has been successfully received, the overhead of the ACK frame can be reduced.

In one embodiment, a bit of the reserved bits B0-B11 of the information per TID subfield in the ACK frame shown in FIG. 9 may indicate whether the ACK frame includes the block ACK bitmap, i.e., is the block ACK. For example, the last bit B11 of the reserved bits B0-B11 may indicate the block ACK. In another embodiment, a bit of the reserved bits B0-B11 of the information per TID subfield in the ACK frame shown in FIG. 7 may indicate whether the ACK frame is the block ACK.

Referring to FIG. 10, a transmitting device may transmit a PPDU including a plurality of A-MPDUs. In the plurality of A-MPDUs, an A-MPDU for a certain AC includes a single MPDU and an A-MPDU for other AC includes no single MPDU. FIG. 10 shows an example where the PPDU includes an A-MPDU to which "TID1" is assigned as the TID and a single MPDU to which "TID2" is assigned as the TID. A receiving device receiving the PPDU transmits an ACK frame to the transmitting device after a predetermined IFS interval.

The ACK frame is an ACK frame into which a multi-TID block ACK frame and a multi-TID ACK frame are multiplexed, and may use a multi-TID block ACK frame format defined in the HT WLAN.

Referring to FIG. 11, for the TID on which the A-MPDU is transmitted, the BA information field includes an information per TID subfield, a block ACK starting sequence control subfield, and a block ACK bitmap subfield as shown in FIG. 7. For the TID on which the single MPDU is transmitted, the BA information field includes an information per TID subfield as shown in FIG. 9. That is, the information per TID subfield, the block ACK starting sequence control subfield, and the block ACK bitmap subfield are repeated for each TID on which the A-MPDU is transmitted, and the information per TID subfield is repeated for each TID on which the single MPDU is transmitted. Since the A-MPDU is transmitted for TID1 and the single MPDU is transmitted for TID2 in an example shown in FIG. 10, the ACK frame includes the information per TID subfield, the block ACK starting sequence control subfield, and the block ACK bitmap subfield for TID1 and includes the information per TID for TID2.

The transmitting device receiving the ACK frame can identify whether the MPDUs aggregated in the A-MPDU have been successfully received based on the TID value and the block ACK bitmap for the TID on which the A-MPDU is transmitted, and can identify whether the single MPDU has been successfully received based on the TID value for the TID on which the single MPDU is transmitted.

In one embodiment, for each TID, a bit of the reserved bits B0-B11 of the information per TID subfield may indicate whether the ACK frame for a corresponding TID is the block ACK. In another embodiment, for only the TID on which the block ACK is not used, a bit of the reserved bits B0-B11 of the information per TID subfield may indicate that the ACK frame is not the block ACK.

While it has been described in the above embodiments that the ACK frame uses the information per TID subfield, the block ACK starting sequence control subfield, and the block ACK bitmap subfield or uses the information per TID subfield in accordance with whether the multi-AC PPDD includes the A-MPDU or the single MPDU, the other conditions may be used.

In some embodiments, when a data unit does not include an A-MPDU and a single MPDU, i.e., includes MPDUs that are not aggregated, an information per TID subfield, a block ACK starting sequence control subfield, and a block ACK bitmap subfield may be used as ACK information.

In some embodiments, when a data unit includes one MPDU that is not a single MPDU, an information per TID subfield, a block ACK starting sequence control subfield, and a block ACK bitmap subfield may be used as ACK information.

Figure 12:
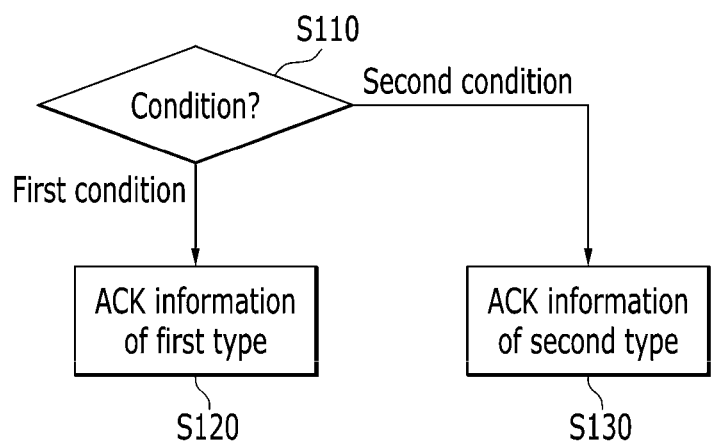
FIG. 12 is a flowchart exemplifying information selection of an ACK frame in a wireless communication network according to an embodiment of the present invention.

FIG. 12 is a flowchart exemplifying information selection of an ACK frame in a wireless communication network according to an embodiment of the present invention.

As shown in FIG. 12, a device determines a condition (S110). When the determined condition is a first condition, the device inputs ACK information of a first type to an ACK frame (S120). When the determined condition is a second condition, the device inputs ACK information of a second type to the ACK frame (S130). The ACK information of the first type may correspond to an information per TID subfield, a block ACK starting sequence control subfield, and a block ACK bitmap subfield as described with reference to FIG. 7. The ACK information of the second type may correspond to an information per TID subfield as described with reference to FIG. 9. As such, the type of the ACK information inputted for a TID may be determined depending on the condition of the TID.

In some embodiments, the first condition may be a condition that an A-MPDU does not include a single MPDU, and the second condition may be a condition that an A-MPDU includes a single MPDU.

In some embodiments, the first condition may be a condition that an A-MPDU is not indicated to a single MPDU by information such as an EOF field, and the second condition may be a condition that an A-MPDU is indicated to a single MPDU by information such as an EOF field.

In some embodiments, the first condition may be a condition that an A-MPDU includes a plurality of MPDUs, and the second condition may be a condition that an A-MPDU includes one MPDU.

In some embodiments, the device may input the ACK information of the second type to the ACK frame when the data unit satisfies the second condition and has been successfully received in the step S130.

In another embodiment of the present invention, a transmitting device may set an ACK policy and a receiving device may transmit an ACK in accordance with the ACK policy. This embodiment is described with reference to Table 1 and FIG. 13.

Figure 13:
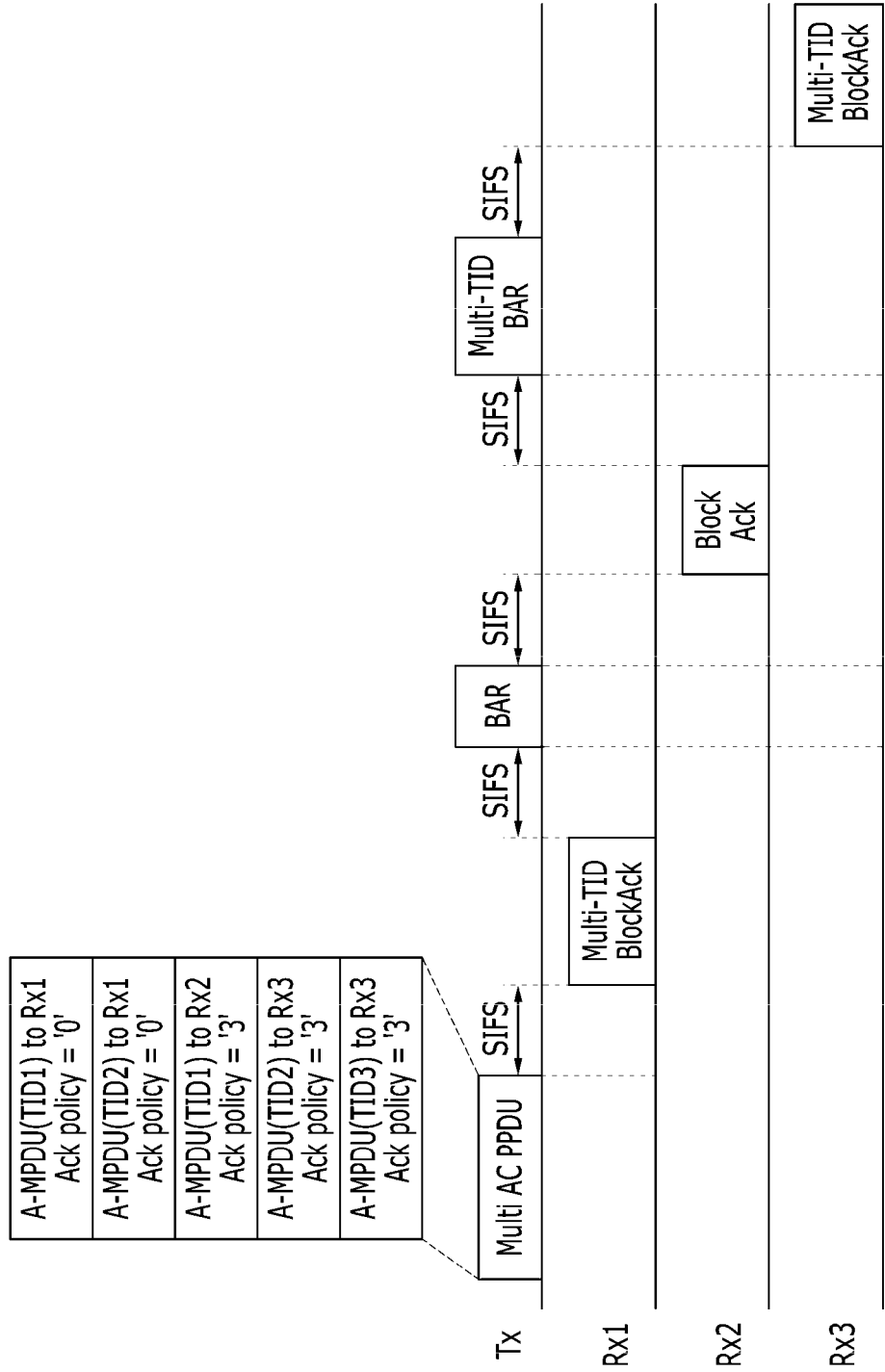
FIG. 13 exemplifies an ACK procedure in a wireless communication network according to another embodiment of the present invention.

Table 1 shows an ACK policy in a wireless communication network according to another embodiment of the present invention, and FIG. 13 exemplifies an ACK procedure in a wireless communication network according to another embodiment of the present invention.

TABLE 1

| | Single AC transmission | | Multi-AC transmission | |
|---|---|---|---|---|
| Value | Non A-MPDU or single MPDU | A-MPDU | Single MPDU | Non single MPDU |
| 0 | Normal ACK (ACK) | Implicit Block Ack (block ACK) | Normal ACK (Multi-TID ACK) | Implicit block Ack (Multi-TID block ACK) |
| 1 | No explicit acknowledgement or PSMP Ack | | — | |
| 2 | No Ack (No response) | No Ack (No response) | No Ack (No response) | No Ack (No response) |
| 3 | — | Block Ack Wait for receiving BlockAck Request (BAR) | — | Block Ack Wait for receiving Multi-TID BlockAck Request (BAR) |

In some embodiments, the ACK policy may have a setting value of 2 bits, and may be included in, for example, a QoS (quality of service) control field of a data frame.

As shown in Table 1, the ACK policy setting value of 0 indicates to respond as a normal ACK, i.e., a multi-TID ACK frame for a single MPDU and to respond as a block ACK, i.e., a multi-TID block ACK frame for an A-MPDU. The ACK policy setting value of 2 indicates that no ACK needs to be transmitted as a response. The setting value of the ACK policy of 3 indicates to respond as the multi-TID block ACK frame after receiving a multi-TID block ACK request (BAR) for the A-MPDU.

Accordingly, when the multi-AC PPDU is used, the ACK procedure can be performed by setting the ACK policy.

In some embodiments, as shown in Table 1, the ACK policy setting value may be applied to a PPDU using a single AC not a plurality of ACs. The ACK policy setting value of 0 indicates to respond as an ACK frame for a non A-MPDU or an MPDU and to respond as a block ACK frame for an A-MPDU. The setting value of the ACK policy of 1 indicates that no explicit acknowledgement or PSMP ACK is required. The ACK policy setting value of 2 indicates that no ACK needs to be transmitted as a response. The setting value of the ACK policy of 3 indicates to respond as the block ACK frame after receiving a block ACK request (BAR) for the A-MPDU.

Next, referring to FIG. 13, a transmitting device may transmit a PPDU including A-MPDUs. FIG. 13 shows an example where the PPDU include A-MPDUs 121, 122, 123, 124, and 125. The A-MPDU 121 is assigned "TID1" as the TID, is toward a receiving device Rx1, and has an ACK policy set to 0. The A-MPDU 122 is assigned "TID2" as the TID, is toward the receiving device Rx1, and has an ACK policy set to 0. The A-MPDU 123 is assigned "TID1" as the TID, is toward a receiving device Rx2, and has an ACK policy set to 3. The A-MPDU 124 is assigned "TID2" as the TID, is toward a receiving device Rx3, and has an ACK policy set to 3. The A-MPDU 125 is assigned "TID3" as the TID, is toward the receiving device Rx3, and has an ACK policy set to 3.

The receiving device Rx1 receiving the A-MPDUs 121 and 122 with the ACK policy of 0 transmits a multi-TID block ACK frame after the SIFS interval. The receiving device Rx1 sets whether the A-MPDU has been received for each TID as a block ACK bitmap. The receiving device Rx2 or Rx3 receiving the A-MPDU 123, 124, or 125 with the ACK policy of 3 waits without transmitting an ACK.

The transmitting device receives the multi-TID block ACK frame from the receiving device Rx1 and then transmits a BAR frame to the receiving device Rx2 after the SIFS interval. Since the A-MPDU 123 transmitted to the receiving device Rx2 has a single TID (TID1), the transmitting device transmits a normal BAR frame thereby requesting the receiving device Rx2 to transmit a block ACK. The BAR frame uses a BlockAckReq frame format defined in the previous WLAN. The receiving device Rx2 receiving the BAR frame transmits a block ACK frame after the SIFS interval. The block ACK frame sets whether the A-MPDU 123 has been received as a block ACK bitmap.

Next, the transmitting device receives the block ACK frame from the receiving device Rx2 and then transmits a multi-TID BAR frame to the receiving device Rx3 after the SIFS interval. Since the A-MPDUs 124 and 125 transmitted to the receiving device Rx3 have multi TIDs (TID2 and TID3), the transmitting device transmits a multi-TID BAR frame thereby requesting the receiving device Rx3 to transmit a multi-TID block ACK. The receiving device Rx3 receiving the multi-TID BAR frame transmits the block ACK frame after the SIFS interval. The receiving device Rx3 sets whether the A-MPDU has been received for each TID as a block ACK bitmap.

Each receiving device can transmit the ACK in accordance with its ACK policy through the above procedure.

While the ACK for a frame having a plurality of ACs has been described above, an embodiment of the present invention may be applied to an ACK on frames that are simultaneously transmitted to a plurality of receiving devices. In a wireless communication network according to an embodiment of the present invention, a multi-user (MU), i.e., a plurality of stations may simultaneously transmit uplink (UL) frames (for example, PPDUs) using UL MU-MIMO or OFDMA transmission. In this case, a method in which a device, i.e., an AP, receiving the UL PPDUs transmits an ACK is described.

Figure 14:
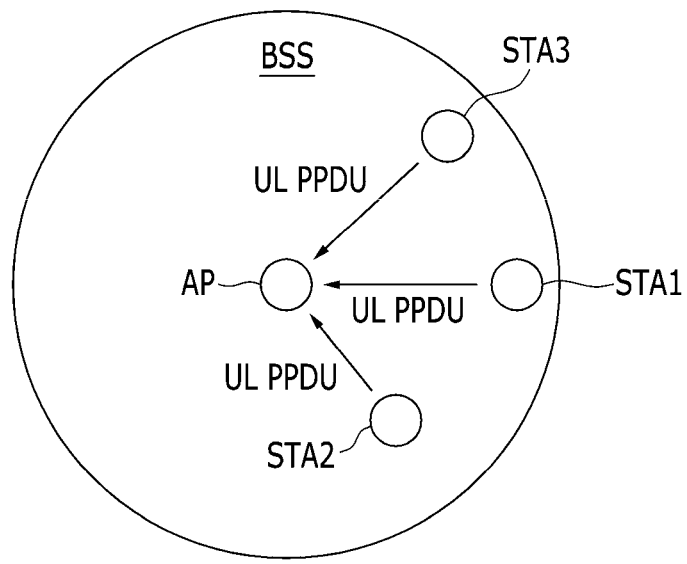
FIG. 14 shows an example of a wireless communication network according to another embodiment of the present invention.
Figure 15:
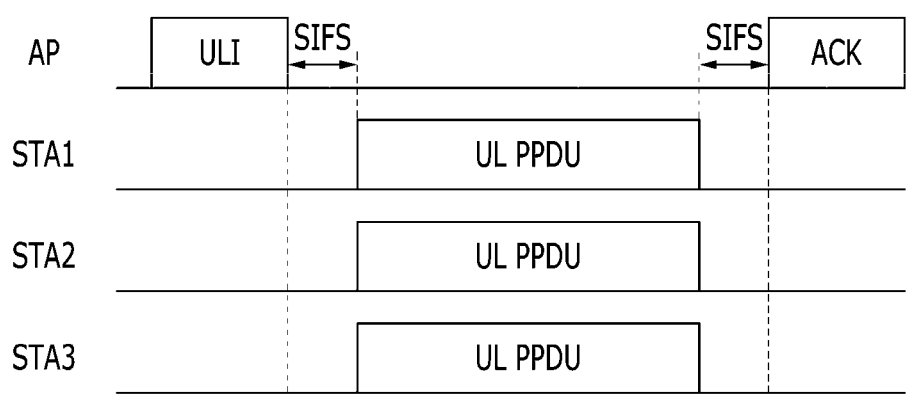
FIG. 15 exemplifies a UL MU transmission procedure in a wireless communication network according to another embodiment of the present invention.
Figure 16:
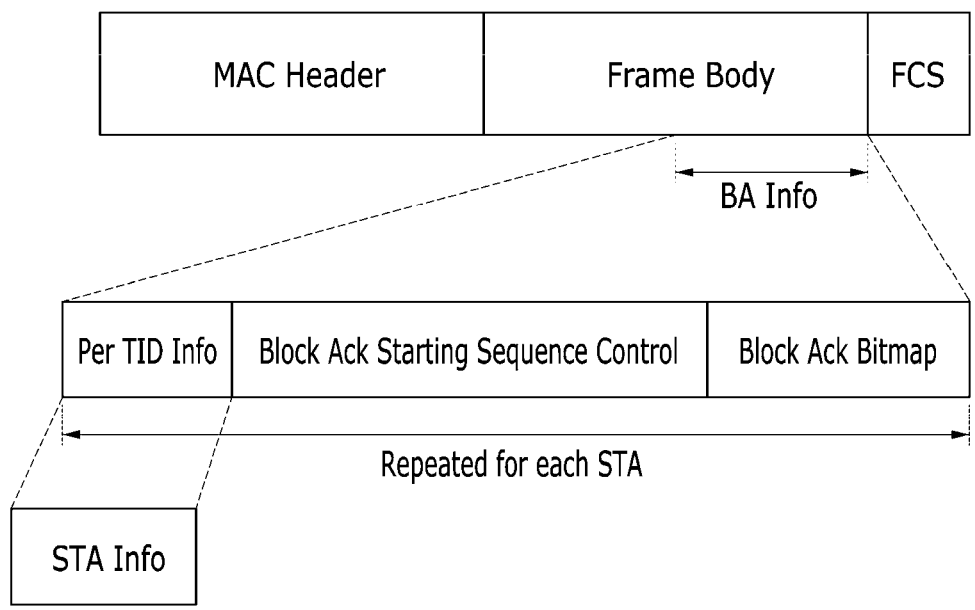
FIG. 16 and FIG. 17 exemplify an ACK frame in a wireless communication network according to embodiments of the present invention.
Figure 17:
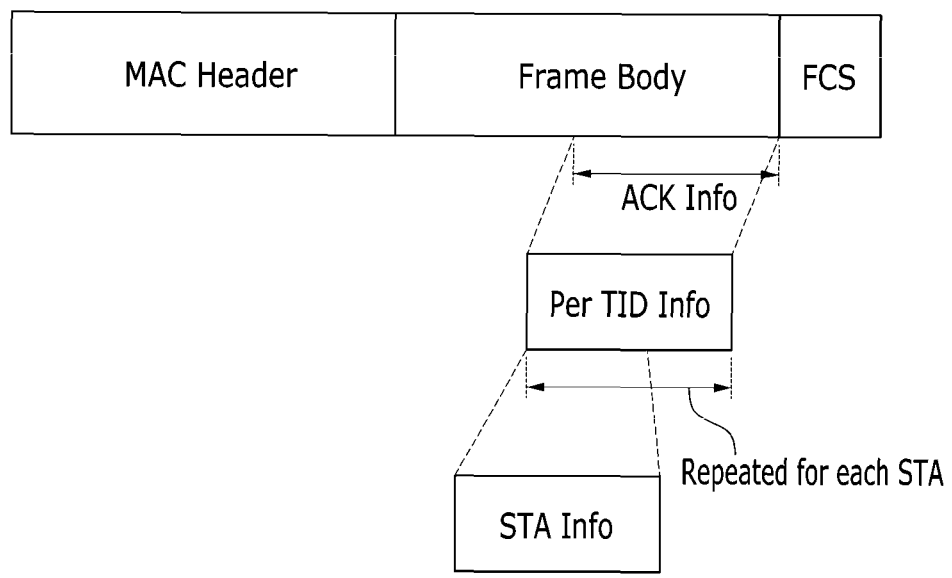
Figure 18:
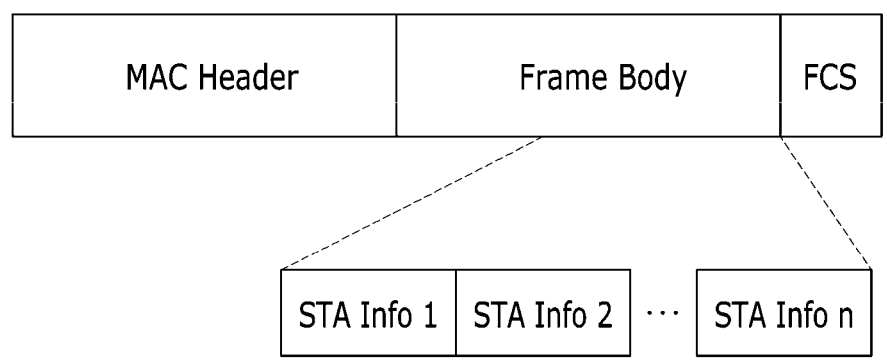
FIG. 18 and FIG. 19 exemplify a UL initiation frame in a wireless communication network according to embodiments of the present invention.
Figure 19:
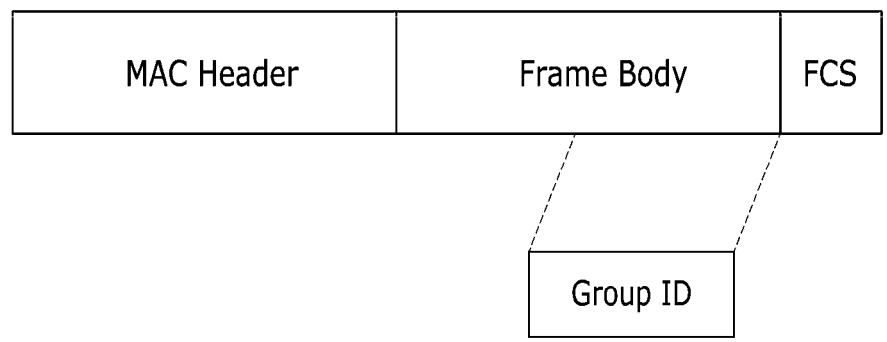

FIG. 14 shows an example of a wireless communication network according to another embodiment of the present invention, FIG. 15 exemplifies a UL MU transmission procedure in a wireless communication network according to another embodiment of the present invention, FIG. 16 and FIG. 17 exemplify an ACK frame in a wireless communication network according to embodiments of the present invention, and FIG. 18 and FIG. 19 exemplify a UL initiation frame in a wireless communication network according to embodiments of the present invention.

Referring to FIG. 14, a basic service set (BSS) includes a plurality of WLAN devices. The WLAN devices include a device that is an AP and a device that is a non-AP station, i.e., a station. In FIG. 14 and FIG. 15, three stations STA1, STA2, and STA3 are shown for convenience, but the number of stations is not limited thereto.

Referring to FIG. 15, the AP first transmits a UL initiation (ULI) frame to perform UL MU transmission with a plurality of stations STA1, STA2, and STA3. The AP may transmit the ULI frame whose recipient is a group including the stations STA1, STA2, and STA3. The ULI frame indicates the stations STA1, STA2, and STA3 to initiate the UL MU transmission. In some embodiments, the ULI frame may include setup information to be used for the UL MU transmission by each station.

Each of the stations STA1, STA2, and STA3 receiving the ULI frame transmits a UL data frame, for example a UL PPDU. The AP receiving the UL PPDUs from the stations STA1, STA2, and STA3 transmits an ACK frame on the UL PPDUs to the stations STA1, STA2, and STA3. In one embodiment, the ACK frame may include information of each station and information about whether the UL PPDU from the corresponding station has been received to allow each station to check an acknowledgement on its UL PPDU. In another embodiment, the ACK frame may include information about whose UL PPDU has been successfully received from among the stations.

The stations STA1, STA2, and STA3 can transmit the UL PPDUs to the AP through the above procedure.

In some embodiments, the ACK frame may use a block ACK frame described with reference to FIG. 7. Referring to FIG. 16, the block ACK frame includes a MAC header, a frame body field, and an FCS field, and the frame body field includes a BA information field, like a multi-TID block ACK frame shown in FIG. 7.

Differently from an embodiment described with reference to FIG. 7, since the AP transmits the ACK on the UL PPDUs received from the stations STA1, STA2, and STA3, the BA information field may have a variable length according to the number of stations. Accordingly, the BA information field may include an information per TID subfield, a block ACK starting sequence control subfield, and a block ACK bitmap subfield, for each station. The information per TID subfield may include information of a corresponding station, for example identification information of the corresponding station. Therefore, the information per TID subfield may be called an information per station subfield. The block ACK bitmap subfield may indicate whether MPDUs aggregated in an A-MPDU included in the UL PPDU of the corresponding station have been received.

In some embodiments, when the multi-TID block ACK frame format is used, a part or whole of reserved bits B0-B11 in the information per TID subfield may indicate the identification information of the station. In this case, some bits of an association identifier (AID) between the station and the AP may be used as the identification information of the station.

In some embodiment, a part of the reserved bits B0-B11 may indicate whether the ACK for the station is a block ACK.

Accordingly, each station can check the ACK on its UL PPDU from bitmap information of the block ACK corresponding to the station.

In some embodiments, the ACK frame described with reference to FIG. 16 may be applied to a case that the UL PPDU includes no single MPDU.

In another embodiment, the ACK frame may use an ACK frame described with reference to FIG. 9. Referring to FIG. 17, the ACK frame includes a MAC header, a frame body field, and an FCS field like a multi-TID ACK frame shown in FIG. 9.

Differently from an embodiment described with reference to FIG. 9, since the AP transmits the ACK on the UL PPDUs received from the stations STA1, STA2, and STA3, the BA information field (i.e., an ACK information field) may have a variable length according to the number of stations. Accordingly, the ACK information field may include an information per TID subfield for each station. The information per TID subfield may include information of a corresponding station, for example identification information of the corresponding station. Therefore, the information per TID subfield may be called an information per station subfield. Differently from an embodiment shown in FIG. 16, a block ACK starting sequence control subfield and a block ACK bitmap subfield are not included in the ACK information field.

In some embodiments, the ACK information may include the information per TID subfield for only a station for which the ACK is transmitted.

In some embodiments, when the multi-TID ACK frame is used, a part or whole of reserved bits B0-B11 of the information per TID subfield may indicate the identification information of the station. In this case, some bits of an AID between the station and the AP may be used as the identification information of the station.

In some embodiment, a part of the reserved bits B0-B11 may indicate whether the ACK for the station is not a block ACK.

Accordingly, each station can check the ACK on its UL PPDU by determining whether its information exists in the ACK information field. In some embodiments, the ACK frame described with reference to FIG. 17 may be applied to a case that the UL PPDU includes a single MPDU.

In some embodiments, an interval between two frames shown in FIG. 15 may be a predetermined IFS interval. The predetermined IFS may be an SIFS. Alternatively, the predetermined IFS may be a PIFS or an IFS having the different duration from the SIFS and the PIFS. Accordingly, a plurality of devices can transmit frames without a collision in an unlicensed band.

In some embodiments, the ULI frame may include identification information (for example, address information) of each of the stations STA1, STA2, and STA3 for joining in the UL MU transmission. Each station can transmit a UL request (UL req) frame when it corresponds to any one of the plurality of station identification information included in the ULI frame. In another embodiment, the ULI frame may include group information to which candidate stations STA1, STA2, and STA3 belong. The group information may be a group ID. Then, each station can transmit the UL req frame when a group to which it belongs corresponds to the group information included in the ULI frame.

In some embodiments, the ULI frame may be a control frame or a management frame. That is, as shown in FIG. 18 and FIG. 19, the ULI frame may include a MAC header, a frame body field, and an FCS field. The MAC header includes an address, and the address field may include a TA field indicating an address of the AP.

As shown in FIG. 18, the frame body field may include information (STA Info 1, STA Info 2, . . . , STA Info n) of the stations STA1, STA2, and STA3. The information (STA Info i) of each station may indicate identification information of the station. In this case, some bits of an AID between the station and the AP may be used as the identification information of the station.

In another embodiment, as shown in FIG. 19, the frame body field may include group information to which the stations STA1, STA2, and STA3 belong. The group information may be an identifier (group ID) of the group.

In some embodiments, the UL PPDU transmitted by each device may have a plurality of ACs as described above. These embodiments are described with reference to FIG. 20 and FIG. 21.

Figure 20:
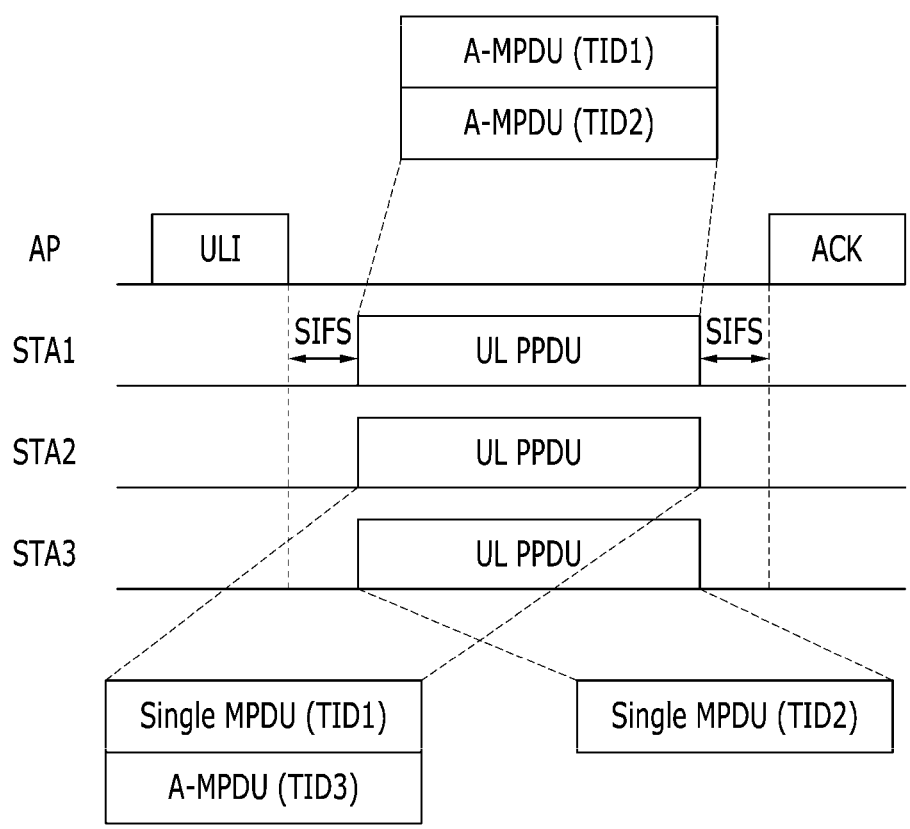
FIG. 20 exemplifies a UL MU transmission procedure in a wireless communication network according to yet another embodiment of the present invention.
Figure 21:
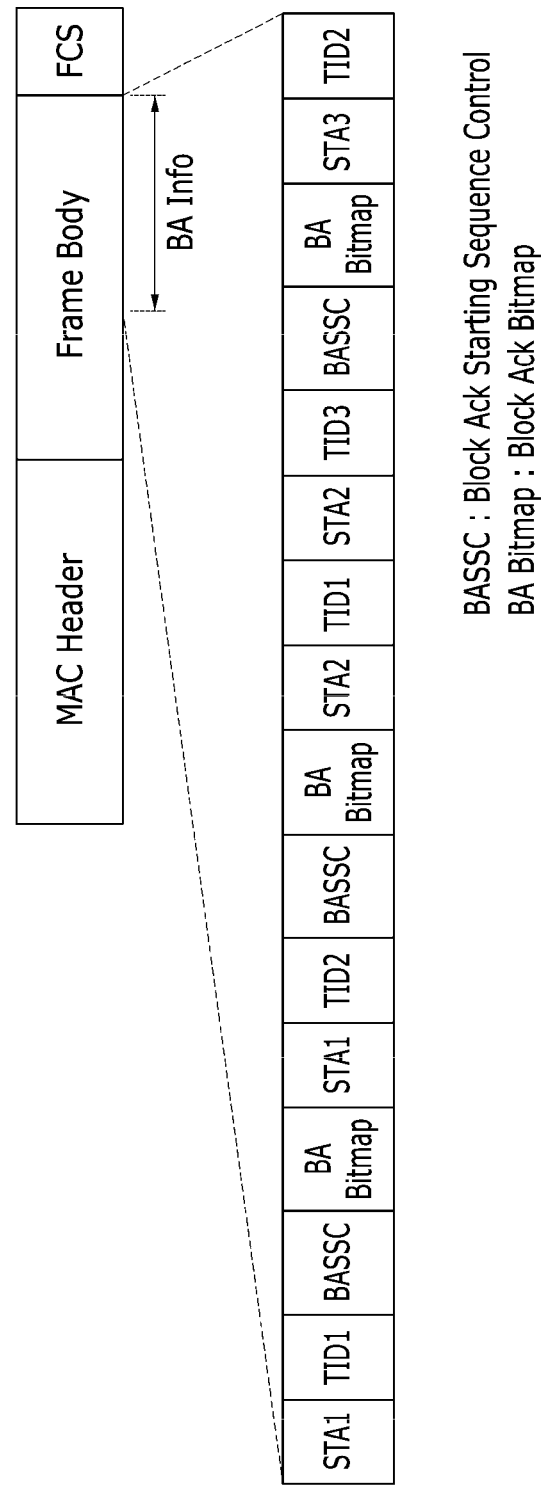
FIG. 21 exemplifies an ACK frame in a wireless communication network according to yet another embodiment of the present invention.

FIG. 20 exemplifies a UL MU transmission procedure in a wireless communication network according to yet another embodiment of the present invention, and FIG. 21 exemplifies an ACK frame in a wireless communication network according to yet another embodiment of the present invention.

Referring to FIG. 20, an AP transmits a ULI frame to perform a UL MU transmission with a plurality of stations STA1, STA2, and STA3.

Each of the stations STA1, STA2, and STA3 receiving the ULI frame transmits a UL data frame, for example a UL PPDU. Each UL PPDU includes an A-MPDU corresponding to one or more ACs. The A-MPDU may be an A-MPDU including no single MPDU or an A-MPDU including a single MPDU. FIG. 20 shows an example where a UL PPDU transmitted to the station STA1 includes an A-MPDU to which "TID1" is assigned as the TID and an A-MPDU to which "TID2" is assigned as the TID, a UL PPDU transmitted to the station STA2 includes an A-MPDU to which "TID1" is assigned as the TID and an A-MPDU to which "TID3" is assigned as the TID, and a UL PPDU transmitted to the station STA3 includes an A-MPDU to which "TID2" is assigned as the TID. The A-MPDU of the station STA1 to which "TID1" is assigned and the A-MPDU of the station STA3 to which "TID2" is assigned include the single MPDU, and remaining A-MPDUs include no single MPDU.

The AP receiving the UL PPDUs from the stations STA1, STA2, and STA3 transmits an ACK frame on the UL PPDUs to the stations STA1, STA2, and STA3. The ACK frame may include information of each station and information about whether the UL PPDU from the corresponding station has been received to allow each station to check an acknowledgement on its UL PPDU.

The ACK frame may use an ACK frame described with reference to FIG. 11. Referring to FIG. 21, the ACK frame includes a MAC header, a frame body field, and an FCS field, and the frame body field includes a BA information field, like the ACK frame shown in FIG. 11.

Differently from an embodiment described with reference to FIG. 11, since the AP transmits the ACK on the UL PPDUs received from the stations STA1, STA2, and STA3, the BA information field may have a variable length according to the number of stations. Accordingly, the BA information field may include ACK information per TID for each station. For the TID on which the A-MPDU is transmitted, the ACK information per TID may an information per TID subfield, a block ACK starting sequence control subfield, and a block ACK bitmap subfield. For the TID on which the single MPDU is transmitted, the ACK information per TID field may include an information per TID subfield. That is, the ACK information per TID is repeated for each station and for each TID.

The information per TID subfield may include information (for example, identification information) of the corresponding station and TID information (for example, a TID value).

In the example shown in FIG. 20, the UL PPDU of the station STA1 includes A-MPDUs for TID1 and TID2 each including no single MPDU, the UL PPDU of the station STA2 includes an A-MPDU for TID1 including a single MPDU and an A-MPDU for TID3 including no single MPDU, and the UL PPDU of the station STA3 includes an A-MPDU for TID2 including a single MPDU. Therefore, the ACK frame includes the information per TID subfield, the block ACK starting sequence control subfield, and the block ACK bitmap subfield for TID1 of the station STA1 and includes the information per TID subfield, the block ACK starting sequence control subfield, and the block ACK bitmap subfield for TID2 of the station STA1. The ACK frame includes the information per TID subfield for TID1 of the station STA2, includes the information per TID subfield, the block ACK starting sequence control subfield, and the block ACK bitmap subfield for TID3 of the station STA2, and includes the information per TID subfield for TID2 of the station STA3.

In some embodiments, when the multi-TID block ACK frame format is used, a part or whole of reserved bits B0-B11 in the information per TID subfield may indicate the identification information of the station. In this case, some bits of an AID between the station and the AP may be used as the identification information of the station.

In some embodiments, a part of the reserved bits B0-B11 may indicate whether the corresponding ACK information per TID is a block ACK. In another embodiment, only when the block ACK is not used, a part of the reserved bits B0-B11 may indicate whether the corresponding ACK information per TID is not the block ACK.

Accordingly, each station can check whether its UL PPDU has been successfully received for each TID.

While it has been described above that the AP transmits one frame, for example one ULI frame, indicating the UL MU transmission for the UL MU transmission, the AP may the frames two or more times to indicate a UL MU-MIMO transmission when the UL MU transmission is the UL MU-MIMO transmission. Such embodiment is described below.

Figure 22:
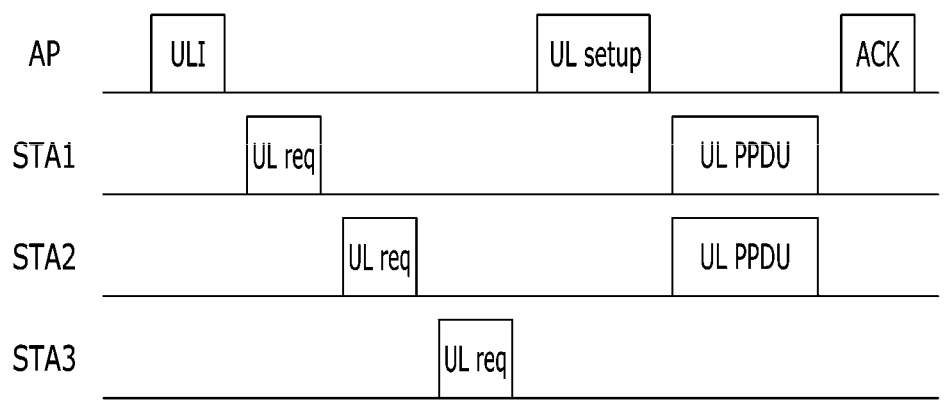
FIG. 22, FIG. 23, FIG. 24, FIG. 25, FIG. 26, FIG. 27, and FIG. 28 exemplify a UL MU procedure in a wireless communication network according to various embodiments of the present invention.

FIG. 22 exemplifies a UL MU procedure in a wireless communication network according to an embodiment of the present invention.

Referring to FIG. 22, an AP transmits a UL MU-MIMO initiation (ULI) frame to perform UL MU-MIMO with a plurality of stations STA1, STA2, and STA3. The ULI frame indicates the stations STA1, STA2, and STA3 to initiate the UL MU-MIMO transmission.

The stations STA1, STA2, and STA3 receiving the ULI frame sequentially transmit UL MU-MIMO request (UL req) frames to the AP. The UL req frame transmitted by each station includes feedback information for the UL MU-MIMO of the corresponding station.

The AP receiving the UL req frame from the stations STA1, STA2, and STA3 selects a station for joining in the UL MU-MIMO from among the stations STA1, STA2, and STA3 based on the feedback information carried by the UL req frame, and transmits a UL MU-MIMO setup (UL setup) frame to the selected stations STA1 and STA2. The UL setup frame includes setup information to be used for the UL MU-MIMO by each station. The setup information may include for example a transmission power, modulation and coding scheme (MCS) information, or a data length to be used by each station. The setup information may further include information on a structure of a long training field (LTF) to be used by each station.

Each of the stations STA1 and STA2 receiving the UL setup frame transmits a UL data frame, for example a UL MU PPDU, based on the setup information. The AP receiving the UL MU PPDUs transmits an ACK frame on the UL MU PPDUs to the stations STA1 and STA2.

The stations STA1 and STA2 can transmit the UL data frame to the AP in the MU-MIMO through the above procedure.

In some embodiments, an interval between two frames shown in FIG. 22 may be a predetermined IFS interval. The predetermined IFS may be an SIFS. Alternatively, the predetermined IFS may be a PIFS or an IFS having the different duration from the SIFS and the PIFS.

In some embodiments, the ULI frame may include identification information of each of the candidate stations STA1, STA2, and STA3 for joining in the UL MU transmission. Each station can transmit the UL req frame when it corresponds to any one of the plurality of station identification information included in the ULI frame. In another embodiment, the ULI frame may include group information to which candidate stations STA1, STA2, and STA3 belong. The group information may be a group ID. Then, each station can transmit the UL req frame when a group to which it belongs corresponds to the group information included in the ULI frame.

In yet another embodiment, the ULI frame may further including channel sounding indication information. The channel sounding indication information indicates whether to perform a channel sounding procedure between the AP and the stations STA1, STA2, and STA3. When the channel sounding indication information channel indicates to perform the channel sounding procedure, the AP may select the station for joining in the UL MU-MIMO based on channel information acquired through the channel sounding procedure of each station. When the channel sounding indication information indicates to perform the channel sounding procedure, beamforming may be supported at the data transmission.

In some embodiments, the stations STA1, STA2, and STA3 receiving the ULI frame may sequentially transmit the UL req frames in a predetermined order. The predetermined order may be for example an address order of the stations.

In some embodiments, the feedback information carried by the UL req frame may include transmission power information. The transmission power information may include information on a magnitude of a current transmission power of a corresponding station. The AP can determine a path loss between the AP and the corresponding station based on the information on the magnitude of the transmission power and a magnitude of a received power of the UL req frame. Accordingly, the transmission power information may be used when the AP determines whether to join the corresponding station in the UL MU-MIMO. The transmission power information may further include information on a magnitude of a maximum transmission power that can be used by the corresponding station.

In another embodiment, the feedback information may include information on a current state of a data queue of the corresponding station. The information on the data queue state may include information about whether data to be transmitted exist in the data queue and information on a size of the data if the data to be transmitted exist. Accordingly, the information on the data queue state may be used when the AP determines whether to include the corresponding in the UL MU-MIMO.

In yet another embodiment, each station may transmit the UL req frame by correcting a carrier frequency offset after receiving the ULI frame. Then, the AP can determine based on the UL req frame whether each station transmits a frame by correcting the carrier frequency offset to acceptable level. Accordingly, the carrier frequency offset that is corrected at the time of the UL req frame transmission may be used for determining whether to include the corresponding station in the UL MU-MIMO transmission. In this case, the stations STA1 and STA2 selected by the UL setup frame may transmit the UL data frames by applying the carrier frequency offsets that have been used at the time of the UL req frame transmission.

In yet another embodiment, when the ULI frame indicates to perform the channel sounding procedure, the number of long training fields used by the UL req frame may be the number of antennas of the corresponding station. That is, the long training field (LTF) is used for estimating a MIMO channel in a frame. For the MIMO channel estimation, the number of HEW long training fields (HEW-LTFs) may be determined in accordance with the number of antennas to be used for transmission, i.e., the number of space-time streams. For example, when the numbers of space-time streams are 1, 2, 3, 4, 5, 6, 7, and 8, the numbers of long training fields may be determined as 1, 2, 4, 4, 6, 6, 8, and 8, respectively. Accordingly, the AP can estimate the channel in each transmitting antennas from the long training fields.

In some embodiments, the UL setup frame that is transmitted by the AP, after the AP selects the stations for performing the MU-MIMO based on the UL req frames received from the candidate stations, includes setup information. The setup information may include common information that is common to all stations for joining in the UL MU-MIMO and dedicated information that is specific to each station.

In some embodiments, the common information is information to be commonly used for the UL MU-MIMO transmission by the station STA1 and STA2, and includes the total number of data streams, i.e., space-time streams to be transmitted by the stations STA1 and STA2 and a transmission length of the UL data frame. The transmission length of the UL data frame may be the number of symbols or a transmission time. Since the AP provides the transmission length, all of the stations STA1 and STA2 can transmit the data frames in accordance with the transmission length. When the transmission length is longer than a length of data to be actually transmitted, the station may add pad bits. Further, each station may determine the number of long training fields (HEW-LTFs) based on the number of space-time streams.

In some embodiments, the dedicated information is information dedicated to each station and is provided for each station. The dedicated information may include identification information of the corresponding station, the number of data streams (i.e., space-time streams) to be transmitted by the corresponding station, a transmission power of the corresponding station, an MCS of the corresponding station, or beam information for the corresponding station. The beam information may be provided as compressed beamforming information like the HT WLAN or the VHL WLAN. The compressed beamforming information may be provided in, for example, the form of angles representing compressed beamforming matrix. Then, the station may transmit the UL data frame by setting the number of space-time streams, a magnitude of the transmission power, the MCS, or a steering matrix in accordance with the dedicated information.

The dedicated information may further include information on the long training fields (HEW-LTF) to be used by the corresponding station. The information on the long training fields (HEW-LTF) may include an index of a row to be used by the corresponding station in a long training field mapping matrix. Accordingly, the station may set codes of the long training fields (HEW-LTF) in accordance with a row vector of the long training field mapping matrix.

In some embodiments, the ACK frame transmitted by the AP may use the ACK frame described with reference to FIG. 16, FIG. 17 or FIG. 21. The ACK frame may indicate whether there are more UL data to be transmitted by each station.

FIG. 23, FIG. 24, FIG. 25, FIG. 26, FIG. 27, and FIG. 28 exemplify UL MU transmission procedure in a wireless communication network according to various embodiments of the present invention.

Figure 23:
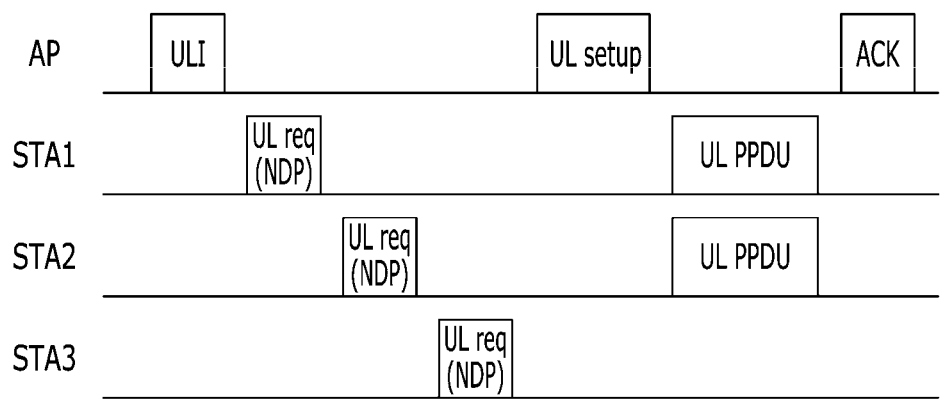

Referring to FIG. 23, each station may transmit a UL req frame as a null data packet (NDP) type frame to perform a sounding procedure for beamforming. Then, an AP transmits a UL setup frame including compressed beamforming information to each station based on the received NDP type frame. A backoff contention window (CW) value may be determined based on the received signal-to-noise ratio (SNR) of the ULI frame. Then, the higher received SNR is, the earlier the stations STA1, STA2, and STA3 may transmit the UL req frames.

As shown in FIG. 24, FIG. 25, FIG. 26, and FIG. 27, downlink (DL) MU transmission may be performed together with the UL MU transmission.

Figure 24:
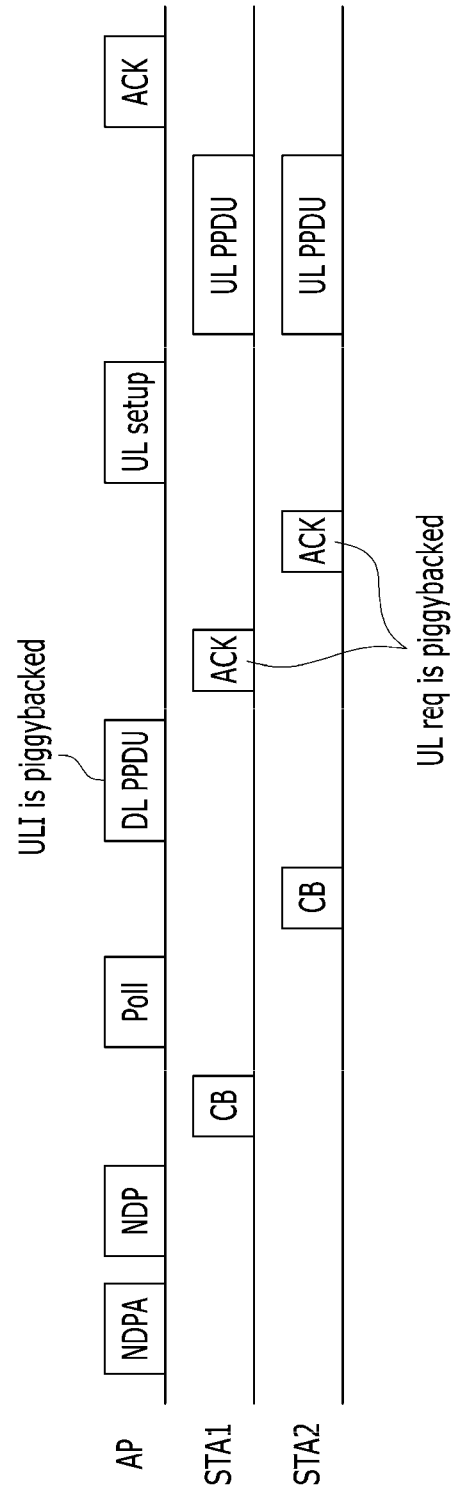

Referring to FIG. 24, an AP first transmits an NDP announcement (NDPA) frame to a plurality of stations STA STA1 and STA2, and then transmits an NDP frame to the stations STA1 and STA2 after the SIFS interval. Among the stations STA1 and STA2 receiving the NDP frame, the first station STA1 feedbacks a compressed beamforming (CB) frame to the AP as a response of the NDPA frame. The AP receiving the CB frame from the station STA1 transmits a beamforming report poll (BR-poll) frame to the second station STA2. The station STA2 receiving the BR-poll frame feedbacks a CB frame to the AP as a response of the BR-poll frame.

Since the CB frame includes compressed beamforming information as feedback information, the AP may determine a steering matrix based on the compressed beamforming information and transmit DL data frame, for example a DL PPDU, to the stations STA1 and STA2 using the steering matrix. The stations STA1 and STA2 receiving the DL PPDU sequentially transmit ACK frames.

Information included in the ULI frame may be piggybacked on the DL PPDU, and information included in the UL req frame may be piggybacked on the ACK frame. Then, the AP and the stations STA1 and STA2 may omit a procedure for exchanging the ULI frame and the UL req frame.

Accordingly, the AP receiving the ACK frames transmits a UL setup frame to the stations STA1 and STA2. The subsequent processes are the same as the processes described with reference to FIG. 22.

Figure 25:
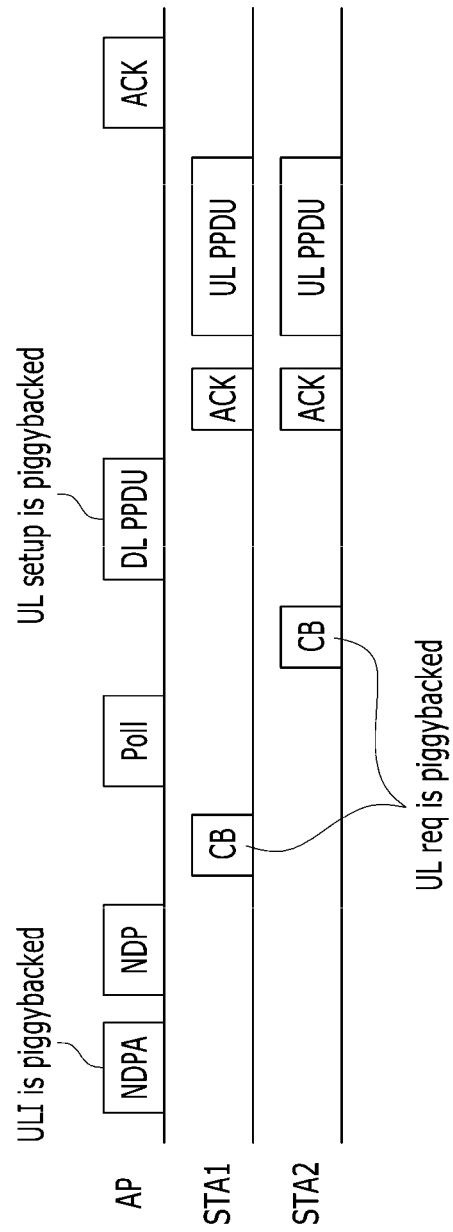

Referring to FIG. 25, information included in a ULI frame is piggybacked on an NDPA frame, information included in a UL req frame is piggybacked on a CB frame, and information included in a UL setup frame is piggybacked on a DL PPDU. Then, the AP and the stations STA1 and STA2 may omit a procedure for exchanging the ULI frame, the UL req frame, and the UL setup frame. Accordingly, the stations STA1 and STA2 may transmit ACK frames on the DL PPDU and then transmit UL MU PPDUs after the predetermined IFS interval.

Figure 26:
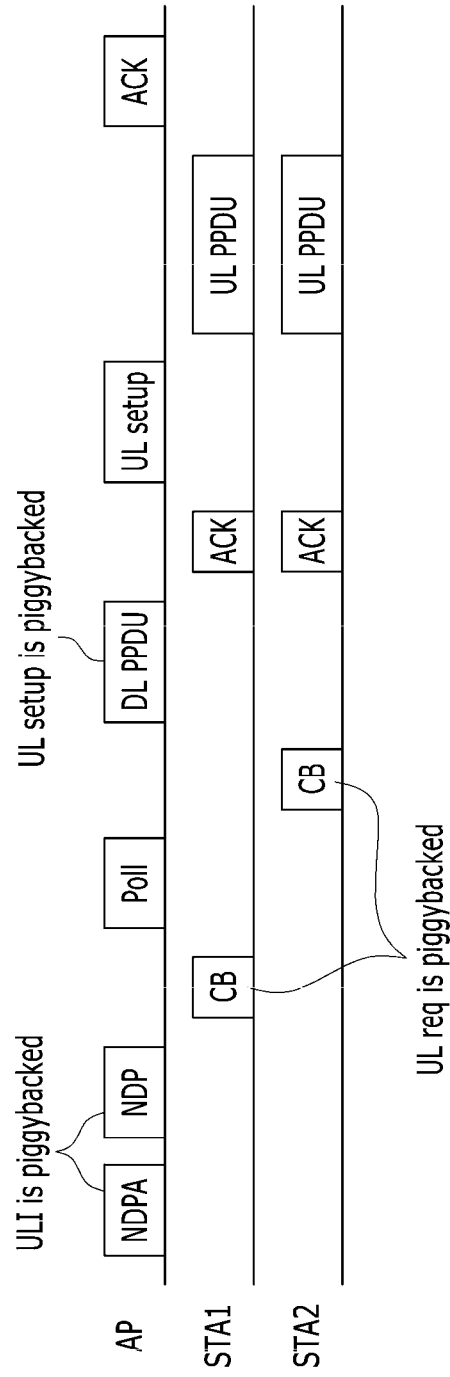

Referring to FIG. 26, if all setup information to be transmitted by a UL setup frame cannot be piggybacked on a DL PPDU, some setup information may be piggybacked on the DL PPDU and remaining setup information may be transmitted by a separate UL setup frame. After receiving the ACK frames on the DL PPDU from the stations STA1 and STA2, the AP may transmit the UL setup frame including the remaining setup information to the stations STA1 and STA2.

Figure 27:
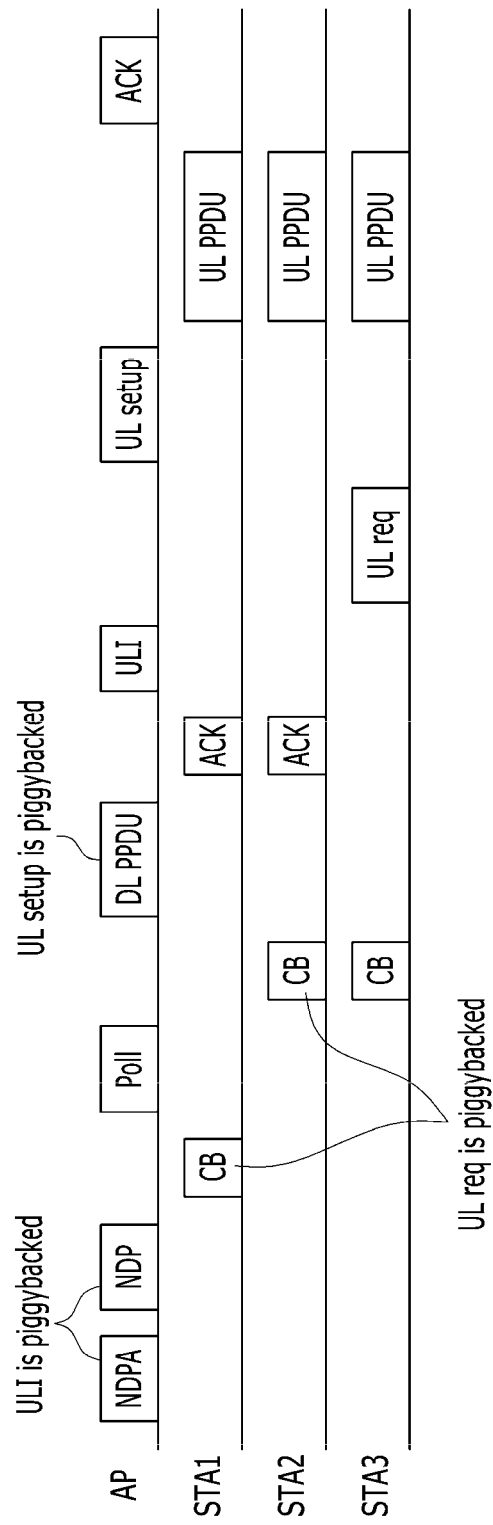

Referring to FIG. 27, while information for UL MU-MIMO transmission is piggybacked on and is transmitted through a frame for DL transmission, an additional STA STA4 may join in a group for the UL MU-MIMO transmission. In this case, an AP and the added station STA4 may exchange a ULI frame, a UL req frame, and a UL setup frame independently of the other stations STA1 and STA2.

According to embodiments described with reference to FIG. 24 to FIG. 27, the UL transmission can be performed subsequently to the DL transmission.

Figure 28:
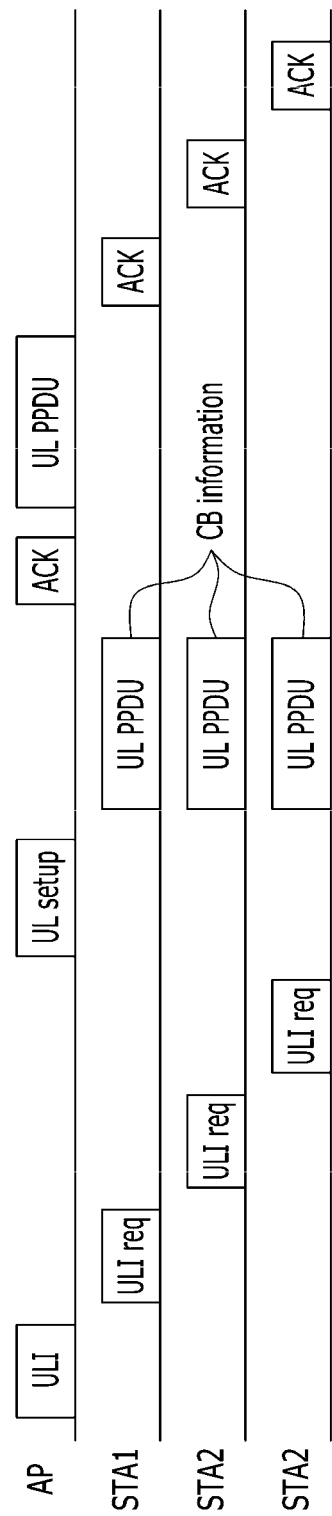

Referring to FIG. 28, after stations STA1, STA2, and STA3 perform UL MU-MIMO transmission with an AP as described with reference to FIG. 22, the AP may perform DL MU-MIMO transmission with the stations STA1, STA2, and STA3. A UL PPDU may include compressed beamforming information for the DL MU-MIMO transmission. Then, the AP may transmit an ACK frame on the UL PPDU and then transmit a DL PPDU to the stations STA1, STA2, and STA3 based on the compressed beamforming information after the predetermined IFS interval. The stations STA1, STA2, and STA3 may sequentially transmit ACK frames on the DL PPDU to the AP.

Accordingly, the DL transmission can be performed subsequently to the UL transmission.

A frame transmitting method and a frame receiving method according to above embodiments of the present invention may be executed by a baseband processor 10 shown in FIG. 1 to FIG. 3. In one embodiment, instructions for executing the frame transmitting method and the frame receiving method according to above embodiments of the present invention may be stored in a recording medium such as a memory 40. In another embodiment, at least some of the instructions may be MAC software. In yet another embodiment, at least some of the instructions may be transmitted from a recording medium of a certain server and may be stored in the memory 40.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Further, two or more embodiments may be combined.

What is claimed is:

1. A method of operating an access point in a wireless communication network, the method comprising:
generating downlink data;
generating uplink setup information, the uplink setup information including a first information to be used for uplink multi-user transmission;
transmitting the downlink data and the uplink setup information in a single physical downlink frame to a plurality of stations;
simultaneously receiving multiple uplink frames from multiple stations of the plurality of stations; and
transmitting an acknowledgement frame to the multiple stations after a successful reception of the multiple uplink frames, wherein the uplink setup information includes a common information portion and a dedicated information portion, the common information portion includes a second information being common to all of the plurality of stations to receive the uplink setup information, and the dedicated information portion includes respective third information specific to each of the plurality of stations to receive the uplink setup information, and wherein the second information is a function of a total number of space time streams to be used to transmit the multiple uplink frames.

2. The method of claim 1, wherein the common information portion includes a length information associated with a length of the multiple uplink frames.

3. The method of claim 2, wherein respective lengths of the multiple uplink frames are identical to a transmission length.

4. The method of claim 3, wherein one or more of the multiple uplink frames include padding bits when the transmission length is longer than a length of a frame to be actually transmitted.

5. The method of claim 1, wherein the dedicated information portion includes a station identification information, an information associated with a number of data streams, and MCS (Modulation and Coding Scheme).

6. The method of claim 1, wherein the acknowledgement frame includes acknowledgement information for one or more of the plurality of stations.

7. The method of claim 1, wherein an interframe space between the uplink setup frame and the multiple uplink frames is SIFS (short interframe space), and an interframe space between the multiple uplink frames and the acknowledgement frame is SIFS.

8. The method of claim 1, wherein the multiple uplink frames are transmitted by the multiple stations using MU-MIMO (multi-user multiple-input multiple-output).

9. A method of operating a station in a wireless communication network, the method comprising:

receiving, from an access point, a physical downlink frame transmitted to a plurality of stations, the physical downlink frame comprising:
uplink setup information including a first information to be used for uplink multi-user transmission by the station, and
downlink data;

transmitting an uplink frame to the access point, the uplink frame being simultaneously transmitted with one or more uplink frames from one or more other stations of the plurality of stations, the uplink frame being generated based on the uplink setup information; and receiving an acknowledgement frame from the access point after the uplink frame is successfully received in the access point, wherein the uplink setup information includes a common information portion and a dedicated information portion, the common information portion includes a second information being common to all of the plurality of stations to receive the uplink setup frame, the dedicated information portion includes respective third information specific to each of the plurality stations to receive the uplink setup information, and wherein the second information is a function of a total number of space time streams to be used to perform the simultaneous transmission of the uplink frame and the one or more uplink frames from the one or more other stations.

10. The method of claim 9, wherein the common information portion includes a length information associated with a length of the uplink frame.

11. The method of claim 10, wherein the length of the uplink frame is identical to the length of each of the one or more uplink frames transmitted from the one or more other stations.

12. The method of claim 11, wherein further the uplink frame includes padding bits when the length of the uplink frame is longer than a length of a frame to be actually transmitted to the access point.

13. The method of claim 9, wherein the dedicated information portion includes a station identification information, an information associated with a number of data streams, and MCS (Modulation and Coding Scheme).

14. The method of claim 9, wherein the acknowledgement frame includes acknowledgement information for the station and one or more other stations of the plurality of stations.

15. The method of claim 9, wherein an interframe space between the uplink setup frame and the uplink frame is SIFS (short interframe space), and an interframe space between the multiple frames and the acknowledgement frame is SIFS.

16. The method of claim 9, wherein the uplink frame of the station and the one or more uplink frames of the one or more other stations are simultaneously transmitted using MU-MIMO (multi-user multiple-input multiple-output).

* * * * *